US 9,984,257 B2

(12) United States Patent
Van De Haar et al.

(10) Patent No.: US 9,984,257 B2
(45) Date of Patent: May 29, 2018

(54) SECURE ELECTRONIC APPARATUS AND METHOD

(71) Applicant: NXP B.V., Eindhoven (NL)

(72) Inventors: Peter Van De Haar, Veldhoven (NL); Franciscus Widdershoven, Eindhoven (NL)

(73) Assignee: NXP B.V., Eindhoven (NL)

(*) Notice: Subject to any disclaimer, the term of this patent is extended or adjusted under 35 U.S.C. 154(b) by 208 days.

(21) Appl. No.: 15/088,309

(22) Filed: Apr. 1, 2016

(65) Prior Publication Data

US 2016/0314322 A1  Oct. 27, 2016

(30) Foreign Application Priority Data

Apr. 23, 2015 (EP) .................................... 15164817

(51) Int. Cl.
| H04L 29/06 | (2006.01) |
| G06F 21/88 | (2013.01) |
| G06F 21/73 | (2013.01) |
| G06F 21/75 | (2013.01) |
| G06F 21/86 | (2013.01) |
| H01L 23/00 | (2006.01) |

(52) U.S. Cl.
CPC ............ G06F 21/88 (2013.01); G06F 21/73 (2013.01); G06F 21/75 (2013.01); G06F 21/86 (2013.01); H01L 23/576 (2013.01); G06F 2221/2103 (2013.01)

(58) Field of Classification Search
CPC .......... G06F 21/88; G06F 21/73; G06F 21/75; G06F 21/86; H01L 23/576

USPC ........................................................ 726/34
See application file for complete search history.

(56) References Cited

U.S. PATENT DOCUMENTS 6,684,335 B1 * 1/2004 Epstein, III ......... H04L 63/0428
                                                    370/256
7,436,297 B1 * 10/2008 Tucker ................... G08B 25/04
                                                    340/508

(Continued)

OTHER PUBLICATIONS

Weiner, M., "A Low Area Probing Detector for Power Efficient Security ICs", Lecture Notes in Computer Science, Jul. 3, 2014, Springer Berlin Heidelberg, XP055211155, ISSN: 0302-9743, ISBN: 978-3-54-045234-8, vol. 8651, pp. 185-197.

(Continued)

Primary Examiner — Michael S McNally

(57) ABSTRACT

A secure electronic apparatus and a method for determining that a secure electronic apparatus has been tampered with. The apparatus includes a memory and a plurality of sensors which each to receive an input signal and output a digital signal determined by the input signal and by a physical quantity sensed by the sensor (e.g. capacitance). A measurement routine includes applying a plurality of input signal values to the sensors and, for each input signal value, using the digital output signals of each sensor to determine a combined output result. The combined output results of the measurement routine are compared with a set of combined output results stored in the memory. A detected a difference between the combined output results of the measurement routine and the set of combined output results stored in the memory can be used to determine that the secure electronic apparatus has been tampered with.

20 Claims, 13 Drawing Sheets

(56) References Cited

U.S. PATENT DOCUMENTS

| | | | | |
|---|---|---|---|---|
| 2002/0104013 A1* | 8/2002 | Ghazarian | ............... | G01S 17/74 |
| | | | | 726/27 |
| 2005/0039040 A1* | 2/2005 | Ransom | ............... | G01R 22/066 |
| | | | | 726/6 |
| 2008/0309396 A1 | 12/2008 | Lee | | |
| 2009/0055612 A1* | 2/2009 | Sibert | ................... | G06F 12/145 |
| | | | | 711/163 |
| 2010/0031368 A1* | 2/2010 | Park | ...................... | G06F 21/554 |
| | | | | 726/26 |
| 2011/0231932 A1* | 9/2011 | Kimelman | .............. | G06F 21/55 |
| | | | | 726/23 |
| 2012/0032834 A1* | 2/2012 | Weeks | .................... | G01S 7/003 |
| | | | | 342/118 |
| 2015/0317496 A1* | 11/2015 | Olmos | ............. | G01R 31/31719 |
| | | | | 726/36 |

OTHER PUBLICATIONS

Extended European Search Report dated Sep. 16, 2015 in EP Application No. 15164817.7.

* cited by examiner

SECURE ELECTRONIC APPARATUS AND METHOD

CROSS-REFERENCE TO RELATED APPLICATIONS

This application claims the priority under 35 U.S.C. § 119 of European Patent application no. 15164817.7, filed on 23 Apr. 2015, the contents of which are incorporated by reference herein.

FIELD OF THE INVENTION

This invention relates to a secure electronic apparatus and to a method for determining that a secure electronic apparatus has been tampered with.

BACKGROUND OF THE INVENTION

As a wireless communications standard, Near Field Communications (NFC) can provide a convenient method for enabling two devices to connect to each other. For applications such as contactless payment, user authentication or building access, additional security is needed.

Secure electronic apparatus such as secure elements found in NFC devices can allow sensitive data, such as personal data or transaction related data to be stored and utilised in a manner that can prevent the data being accessed without the correct authorisation. The secure element may be provided as an integrated circuit that may be incorporated into a device such as a mobile phone or smart card.

A secure element may include features such as a non-volatile memory, a security CPU and crypto coprocessor. The secure element may include features to protect it against tampering and attacks. One mode of tampering includes physical attacks that involve introducing contact pins into the integrated circuit itself, in an attempt directly to access the memory in which the sensitive data is stored. It is known to use an array of sensors, for instance capacitive sensors, in the device to detect intrusions of this kind.

SUMMARY OF THE INVENTION

Aspects of the invention are set out in the accompanying independent and dependent claims. Combinations of features from the dependent claims may be combined with features of the independent claims as appropriate and not merely as explicitly set out in the claims.

According to an aspect of the invention, there is provided a secure electronic apparatus. The secure electronic apparatus includes a memory. The secure electronic apparatus also includes a plurality of sensors. Each sensor includes an input operable to receive an input signal. Each sensor also includes an output operable to output a digital signal determined by a value of the input signal and by a physical quantity sensed by the sensor. The digital signal is indicative of whether the value of the input signal exceeds a detection threshold value for that sensor. The secure electronic apparatus is operable to perform a measurement routine. The measurement routine includes applying a plurality of input signal values to the inputs of the sensors. The measurement routine also includes, for each input signal value, using the digital signals outputted by the sensors to determine a combined output result. The measurement routine further includes comparing the combined output results of the measurement routine with a set of combined output results stored in the memory. The measurement routine also includes, in response to detecting a difference between the combined output results of the measurement routine and the set of combined output results stored in the memory, determining that the secure electronic apparatus has been tampered with.

According to another aspect of the invention, there is provided a method for determining that a secure electronic apparatus has been tampered with. The secure electronic apparatus includes a memory. The secure electronic apparatus also includes a plurality of sensors. Each sensor includes an input operable to receive an input signal. Each sensor also includes an output operable to output a digital signal determined by a value of the input signal and by a physical quantity sensed by the sensor. The digital signal is indicative of whether the value of the input signal exceeds a detection threshold value for that sensor. The method includes performing a measurement routine that includes applying a plurality of input signal values to the inputs of the sensors. The measurement routine also includes, for each input signal value, using the digital signals outputted by the sensors to determine a combined output result. The measurement routine further includes comparing the combined output results of the measurement routine with a set of combined output results stored in the memory. The measurement routine also includes, in response to detecting a difference between the combined output results of the measurement routine and the set of combined output results stored in the memory, determining that the secure electronic apparatus has been tampered with.

By providing a plurality of sensors in a secure electronic apparatus, and by performing a measurement routine in which a digital output of the sensors is compared to a stored result, a determination may be made as to whether the secure electronic apparatus has been tampered with. For instance, a set of combined output results stored in a memory of the apparatus may correspond to expected digital outputs of the sensors prior to any tampering with the apparatus. A difference between the combined output results determined by the measurement routine and the set of combined output results stored in the memory may indicate that tampering of the apparatus has occurred.

Some applications may require a large number of sensors to be used for tamper detection (e.g. hundreds or even thousands). By combining the digital signals outputted by the sensors to determine a combined output result, the task of comparing the outputs with the output results stored in the memory may be simplified, whereby (i) the complexity of any control and data lines required to run the measurement routine may be reduced and whereby (ii) less computation power may be required to run the measurement routine.

The use of sensors having a digital output may alleviate signal degradation in data lines conveying the output signals from each sensor. Embodiments of this invention may use sensors that output a digital signal determined by a value of the input signal and by a physical quantity sensed by the sensor, and for which the outputted digital signal is indicative of whether the value of the input signal exceeds a detection threshold value for that sensor. In some embodiments, the input signal may also be digital (for instance it may include one or more digital clock signals), which again may alleviate signal degradation in lines conveying the input signal to each sensor.

In one embodiment, the combined output result for each input signal value may include a digital word including a plurality of bits. This can allow convenient comparison with a corresponding combined output result stored in the memory for determining whether the secure electronic apparatus has been tampered with. The sensors may be organised in a plurality of groups, each bit of the digital word corresponding to a respective one of the groups. In one such example embodiment, the sensors may be (logically, if not physically) arranged in a plurality of rows and/or columns, where each row or column of sensors corresponds to one of the abovementioned groups. A value of each bit of the digital word may be determined by XOR'ing the digital signals outputted by the sensors in the group corresponding to that bit. In this way, the amount of digital data that is compared to the data stored in memory for detecting tampering may be reduced to a single bit per group. This can reduce the complexity of the comparison, particularly where a large number of sensors are used.

In one example embodiment, each digital word may be appended with one or more bits that indicate of the number of groups of sensors to which that digital word is applicable. In this way, the overall number of bits in the combined output results obtained by the measurement routine may be reduced, again simplifying the computational task and reducing the bandwidth required to convey the combined output results to a processor for comparison with the set of combined output results stored in the memory.

In one example embodiment, the secure electronic apparatus may include a chain of XOR gates. A first input of each XOR gate may be connected to the output of one of the sensors. A second input of at least some of the XOR gates may be connected to an output of a preceding XOR gate in the chain. This may allow the digital signals outputted by the sensors to be XOR'ed locally, which may simplify the arrangement of lines connected to the outputs of the sensors.

At least some of the sensors may belong to more than one group. This may allow the combined output results more accurately to be used for more accurate detection as to whether the apparatus has been tampered with, as it may prevent or reduce the possibility that attacks may be masked by the XOR'ing of the digital signals outputted by the sensors. In one example embodiment, the sensors may be (logically, if not physically) arranged in a plurality of rows (where each row corresponds to a respective group) and columns (where each column corresponds to a respective group), such that each sensor is a member of two groups (i.e. a group that corresponds to the logical row occupied by the sensor and a group that corresponds to the logical column occupied by the sensor).

In one example embodiment, the combined output result for an $n^{th}$ input signal value of the measurement routine may be a value indicating the number of sensors for which the detection threshold value has been exceeded compared to the number of sensors for which the detection threshold value was exceeded for an $(n-1)^{th}$ input signal value. In such examples, the combined output results may be binned to indicate the number of sensors which exceeded their detection threshold in the interval defined by the $(n-1)^{th}$ and $n^{th}$ input signal values.

The input signal values applied to the inputs of the sensors may change monotonically during the measurement routine. For instance, the input signal may sweep through a monotonically increasing (or decreasing) set of values, where each combined output result reflects the increase or decrease in the number of sensors that exceed their detection threshold value in the sweep.

The input signal values may in some example embodiments be equally spaced. In other example embodiments, the size of the intervals between adjacent input signal values may vary. The size of the intervals may be predetermined according to factors such as the anticipated change in the number of sensors that will exceed their detection threshold value in the interval.

In some example embodiments, an order in which input signal values are applied to the inputs of the sensors may be determined pseudo randomly. This can inhibit attempts to defeat the measurement routine with prior knowledge of the ordering of the input signal values in the measurement routine.

The sensors may include one or more capacitors. For instance, the physical quantity sensed by each sensor may be the capacitances of two sense capacitors of each sensor. In such examples, the digital signal may be determined by a ratio of the capacitances of the two capacitors and by the value of the input signal.

The input signal may be a digital input signal. The input signal may include more than one component. For instance, in one example embodiment, the input signal includes a pair of clock signals (which may be digital clock signals). The input signal value may correspond to a delay between the pair of clock signals, which may be of equal frequency. In such examples, an increase or decrease in the input signal value may correspond to an increase or decrease (respectively) in the delay between the clock signals.

In one example embodiment, the secure electronic apparatus may be operable to collect all of the combined output results prior to comparison of the combined output results with the set of combined output results stored in the memory. This can simplify the task of conveying the combined output results to a processor for comparison with the set of stored combined output results.

The secure electronic apparatus may, for example, be implemented as an integrated circuit. The integrated circuit may be a secure element, for instance of the kind used for secure Near Field Communications (NFC) applications (e.g. contactless payments). The integrated circuit may be incorporated into any device requiring tamper detection, such as a mobile communications device (e.g. mobile telephone, tablet, laptop, credit card etc.).

BRIEF DESCRIPTION OF THE DRAWINGS

Embodiments of the present invention will be described hereinafter, by way of example only, with reference to the accompanying drawings in which like reference signs relate to like elements and in which:

FIG. 4C shows an example distribution of the digital outputs of a sensor array of the kind shown in FIG. 4A, after the secure electronic apparatus has been tampered with;

FIGS. 10A and 10B show another example of a set of combined output results for a plurality of input signal values in accordance with an embodiment of this invention, after the secure electronic apparatus has been tampered with;

FIG. 14 shows a further example of a set of combined output results for a plurality of input signal values in accordance with an embodiment of this invention, after the secure electronic apparatus has been tampered with;

FIG. 15 shows a further example arrangement for reading out the digital outputs of the sensor array shown in FIG. 4A in accordance with an embodiment of this invention;

DETAILED DESCRIPTION

Embodiments of the present invention are described in the following with reference to the accompanying drawings.

A secure electronic apparatus of the kind described herein can include a plurality of sensors. These sensors can be used to detect whether the secure electronic apparatus has been tampered with. For instance, the sensors may detect physical changes in the secure electronic apparatus, for instance changes associated with physical attacks against an integrated circuit embodying the secure electronic apparatus.

It is envisaged that a number of different kinds of sensors may be used. The sensors have an input that is operable to receive an input signal, which may for instance be a voltage that is applied to the input of the sensor. As will be explained below in more detail, in some embodiments, the input signal may have more than one component. For instance, it is envisaged that the input signal may include a plurality of clock signals, which may be digital clock signals, having a delay between them. The clock signals may be of equal frequency. A value of the input signal in such examples may correspond to a delay between the clock signals. Each sensor is operable to output a digital signal that may be determined by a value of the input signal and by a physical quantity that is sensed by the sensor. In some examples, the physical quantity is the capacitance of one or more capacitors provided in the sensor. For instance, as will be described below in relation to FIGS. 1 to 3, the digital signal outputted by the sensor may correspond to a ratio of the capacitors within the sensor. The digital signal that is outputted by the sensor is indicative of whether the value of the input signal exceeds a detection threshold value for that sensor.

An example embodiment of a sensor that may be used in accordance with embodiments of this invention is first described below in relation to FIGS. 1 to 3. It will be appreciated that other kinds of sensor may be used and indeed that the details of the internal operation of the sensor are not essential to embodiments of the present disclosure.

In the examples described below in relation to FIGS. 1-3, sensor circuits are described that allow the capacitance of a sense capacitor to be determined relative to that of another sense capacitor. This may allow the ratio of the capacitances of the two sense capacitors to be determined. In some embodiments, the absolute value of the capacitance of the sense capacitors is not known. In some examples however, one of the sense capacitors may be a reference capacitor having a known capacitance. This may allow the absolute value of the other sense capacitor to be determined, for instance by evaluating the ratio the two capacitances.

Figure 1:
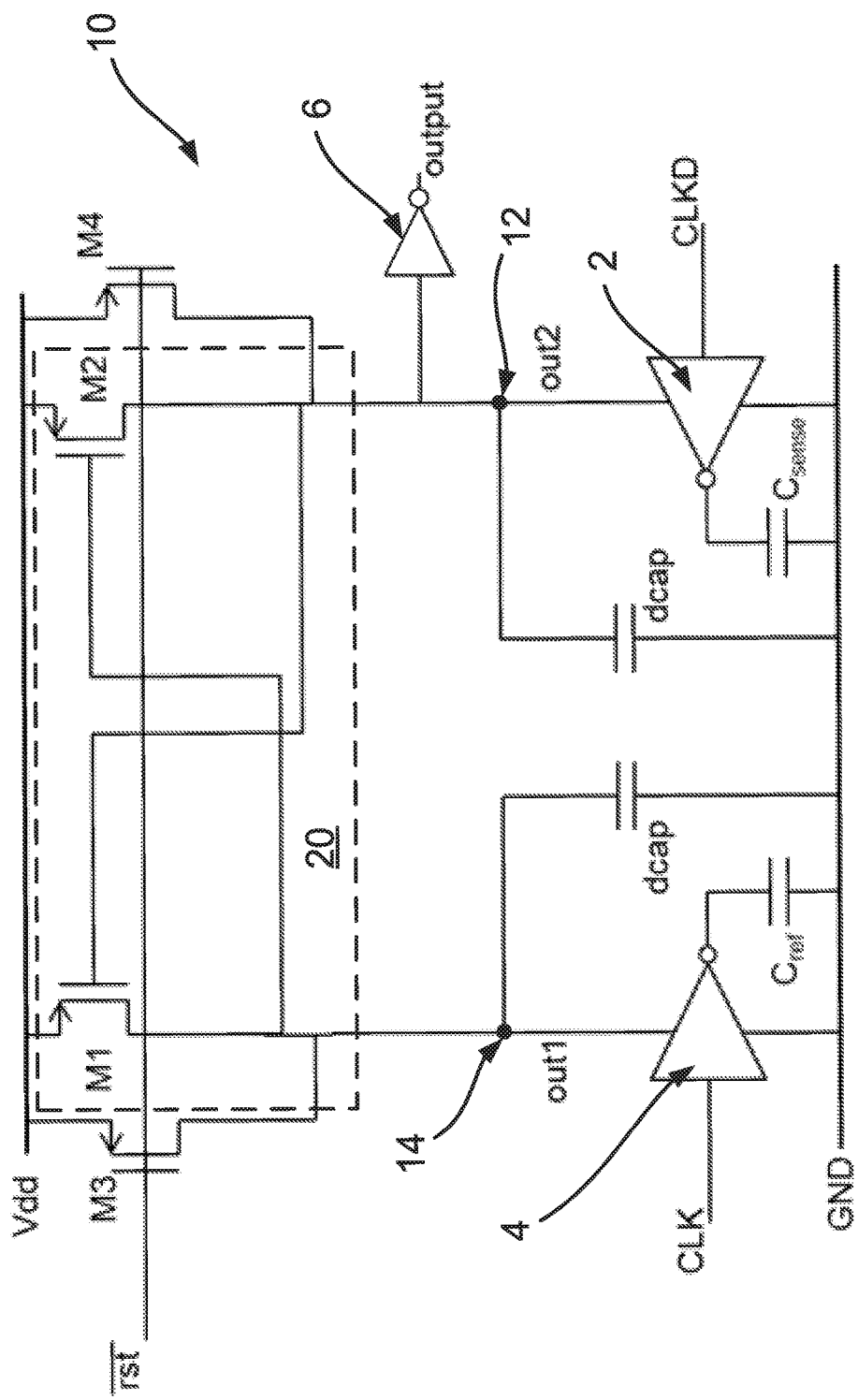
FIG. 1 shows an example of a sensor that can be provided in a secure electronic apparatus in accordance with an embodiment of this invention.
Figure 2:
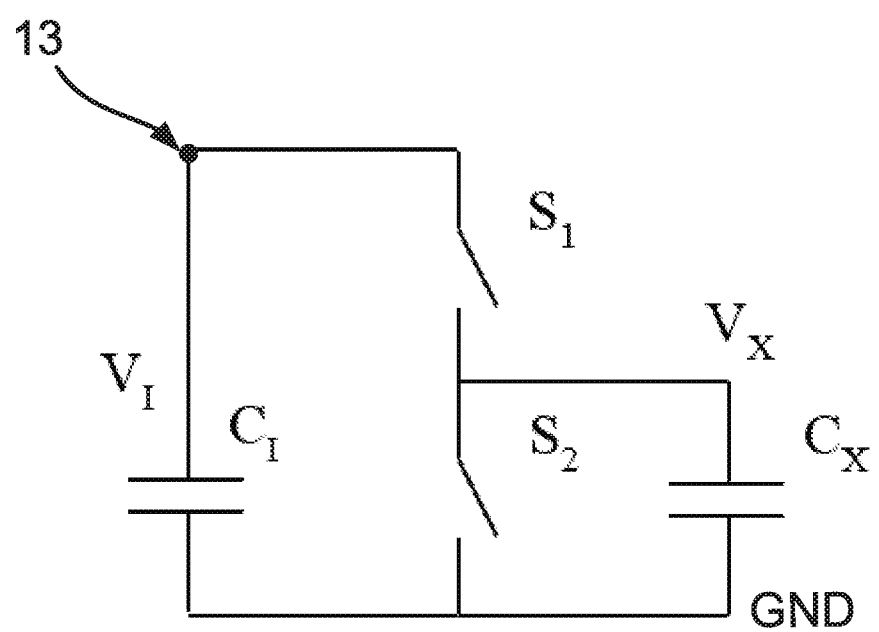
FIG. 2 illustrates the operation of one of the subcircuits of the sensor of FIG. 1.
Figure 3:
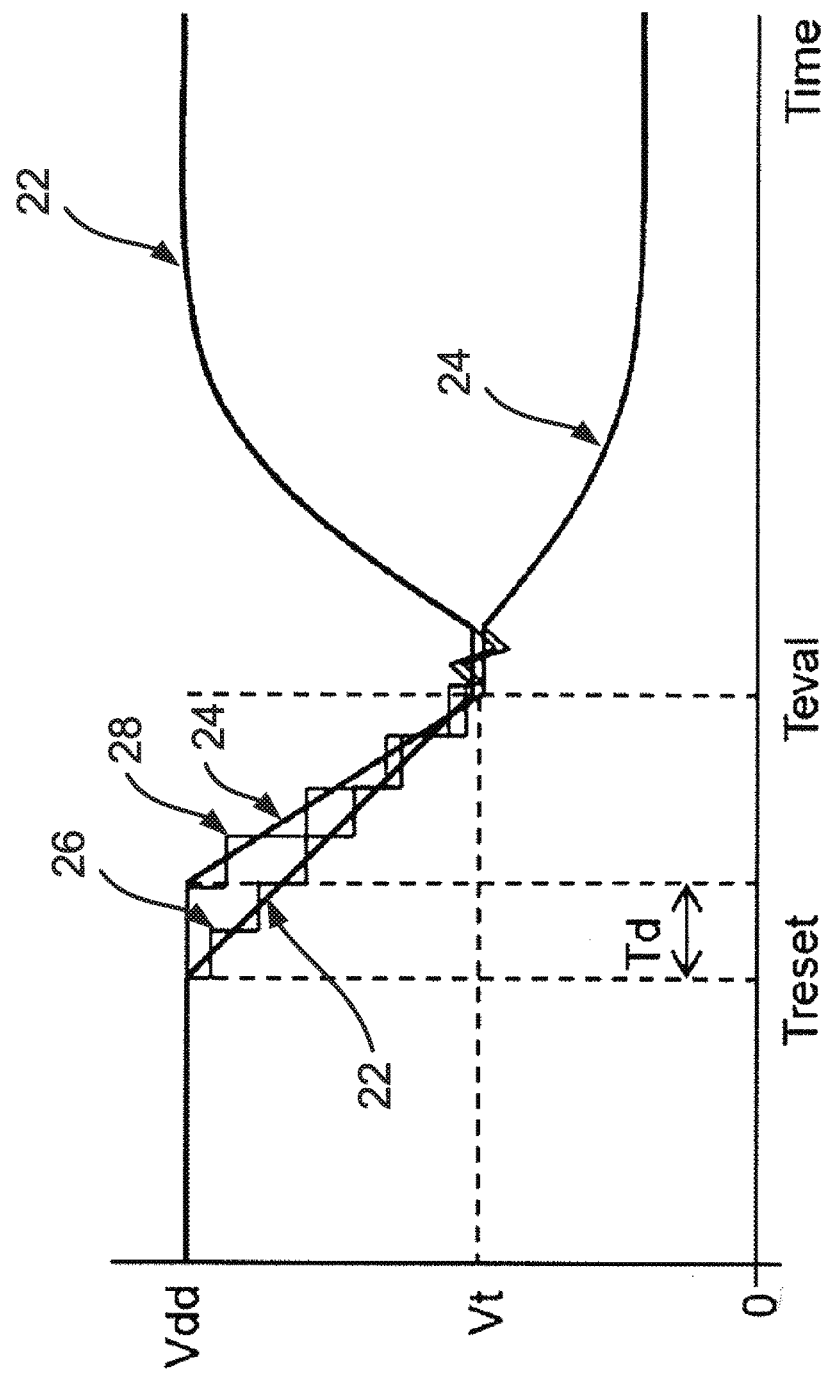
FIG. 3 illustrates waveforms in a sensor circuit of the kind described in relation to FIGS. 1 and 2.

In the examples of FIGS. 1 to 3, the circuit includes a single pair of sense capacitors. However, it is envisaged that in other embodiments, a plurality of pairs of sense capacitors may be provided. Each pair can form a sensor in a larger array comprising a plurality of such sensors. For instance, it is envisaged that a circuit having many hundreds or even thousands of pairs of sense capacitors may be provided.

In accordance with embodiments of this invention, the sensor circuit includes a first subcircuit and a second subcircuit. Each subcircuit can include components for determining the capacitance of a sense capacitor provided in that subcircuit.

The first subcircuit thus includes a first sense capacitor and a first integration capacitor. The first subcircuit also includes a first clock input for receiving a first digital clock signal for initiating discharge of the first integration capacitor at a time T. A rate of discharge of the first integration capacitor is at least partly determined by a capacitance of the first sense capacitor.

Similarly, the second subcircuit also includes a sense capacitor, an integration capacitor and a clock input. The clock input of the second subcircuit can receive a second digital clock signal for initiating discharge of the second integration capacitor at a time $T+T_d$, where $T_d$ corresponds to a delay between initiation of the discharging of the two integration capacitors of the circuit. A rate of discharge of the second integration capacitor is at least partly determined by a capacitance of the second sense capacitor. Note that $T_d$ may be positive or negative, so that discharge of either the first or the second integration capacitor may initiate first.

Thus, each subcircuit includes a sense capacitor, an integration capacitor and a clock input. As will be described in more detail below, the clock inputs, which can receive a digital clock signal, can cause the integration capacitors to be discharged starting at different points in time (T and $T+T_d$, respectively). Since the rate of discharge is at least partly determined by the capacitance of the sense capacitor of each subcircuit, by comparing, after a certain amount of time, the extent to which the integration capacitors have discharged, the capacitance of the two sense capacitors may be indirectly compared. In the example described below in relation to FIG. 1, the comparison is performed by a latch circuit that latches into one of two states in accordance with a voltage at a node within each subcircuit. The latching of the latch circuit may occur when the voltage at one of the nodes decreases below a switch-on voltage for a PMOS transistor of the latch circuit.

The sensor circuit also includes an output, for outputting a digital signal that indicates the result of the comparison of the capacitance of the first and second sense capacitors. In some examples, the digital signal that is outputted may be determined by the state of the latch circuit.

Since the inputs to the sensor circuit may be digital (the inputs include the first digital clock signal and the second digital clock signal) and since the output of the sensor circuit is also digital (for instance, determined according to the state of the latch circuit) the need for analogue inputs and outputs may be reduced. In this way, degradation of signals passing to and from the sensor circuit (in the case of analogue inputs and outputs) may be avoided.

In some embodiments, a plurality of measurements can be made, where the time delay $T_d$ may be altered for each measurement. In this way, the value of $T_d$ that leads to a change in the result outputted by the sensor circuit may be determined. Where the time delay $T_d$ between the initiation of discharge of the two integration capacitors is, for example zero, it may be expected that the amount of discharge of the integration capacitors at evaluation time may be determined entirely by the capacitances of the first and second sense capacitors. However, if a non-zero time delay $T_d$ is introduced (e.g. so that the second integration capacitor starts to discharge later than the first integration capacitor), the first integration capacitor may discharge to a greater extent than the second integration capacitor (since it has a greater time available for discharge than the second integration capacitor), even if the first sense capacitor has a smaller capacitance than the second sense capacitor. By performing a number of repeated measurements, varying $T_d$ in each measurement, a determination can be made as to the amount of time delay that is required to cause the two integration capacitors to discharge by equal amounts, and this amount of time delay is related to the relative capacitances of the first and second sense capacitors. Thus, by determining the amount of time delay required to change the result of the comparison performed by the sensor circuit, information about the capacitances of the two sense capacitors of the sensor circuit can be determined.

FIG. 1 shows a sensor circuit 10 in accordance with a first embodiment of this invention. The circuit 10 includes two power rails. A first power rail is held at first voltage $V_{dd}$ while a second power rail is held at a second voltage, which in the example of FIG. 1 is ground (GND).

The circuit 10 includes a first subcircuit that includes a clock input (CLK) that is connected to an input of an inverter 4. As will be described in more detail below, the inverter 4 may include a pair of transistors, in particular a PMOS transistor connected to an NMOS transistor. An output of the inverter 4 is connected to a terminal of the first sense capacitor, which in the present embodiment is a reference capacitor $C_{ref}$ having a known capacitance. The reference capacitor $C_{ref}$ is also connected at its other terminal to the ground rail GND. The inverter 4 has power supply inputs that are connected to a node 14 of the first subcircuit and the ground rail GND. The first subcircuit further includes a decoupling capacitor (dcap) having a first terminal that is connected the node 14 and a second terminal that is connected to the ground rail GND.

The circuit in FIG. 1 also includes a second subcircuit. The second subcircuit is configured similarly to the first subcircuit. For instance, the second subcircuit also includes an inverter 2 having an input connected to receive a digital clock signal (CLKD) and an output connected to a first terminal of a sense capacitor $C_{sense}$. A second terminal of the sense capacitor $C_{sense}$ is connected to the ground rail GND. The inverter 2 has power supply inputs that are connected to a node 12 of the first subcircuit and the ground rail GND. The second subcircuit also includes a decoupling capacitor (dcap) having a first terminal that is connected the node 12 and a second terminal that is connected to the ground rail GND.

In some embodiments, the circuit of FIG. 1 can be used to determine the ratio of capacitances of the sense capacitor of the first subcircuit and the sense capacitor of the second subcircuit. In the present embodiment, the sense capacitor of the first subcircuit is a reference capacitor as noted above. Accordingly, since the reference capacitor has a known capacitance, the circuit of FIG. 1 may be used to determine an absolute value of the sense capacitor of the second subcircuit by determining the amount of time delay that is required for the results of the comparison of the capacitances of the two sense capacitors to change (i.e. to determine the amount of time delay which is required to overcome any difference in capacitance between the two sense capacitors as determined by the latch circuit described below).

The circuit 10 shown in FIG. 1 also includes an output which may be connected to an inverter 6. In this embodiment, the input of the inverter 6 is connected to the node 12 of the second subcircuit. To provide a balanced circuit, an inverter may also be connected to the node 14 of the first subcircuit, although this inverter may not be used in practice.

In this embodiment, the circuit 10 includes a latch 20, the components of which are shown within the dashed box in FIG. 1. The latch 20 includes a pair of PMOS transistors M1 and M2. The transistors M1 and M2 are cross-coupled. In particular, the gate of M1 is connected to the drain of M2, and the gate of M2 is connected to the drain of M1. The source of M1 and the source of M2 are both connected to the power rail $V_{dd}$. The drain of M1 is also connected to the node 14 of the first subcircuit, while the drain of M2 is also connected to the node 12 of the second subcircuit. The operation of the transistors M1 and M2 will be described in more detail below.

The circuit 10 in FIG. 1 may further include transistors M3 and M4, which may be PMOS transistors. These transistors may be provided to allow resetting of the circuit 10. The source of M3 is connected to the power rail $V_{dd}$ and the drain of M3 is connected to the node 14 of the first subcircuit. The source of the transistor M4 is also connected to the power rail $V_{dd}$ and the drain of the transistor M4 is connected to the node 12 of the second subcircuit. The gate of each transistor M3 and M4 is connected to receive a reset signal.

The operation of the circuit 10 shown in FIG. 1 will now be described.

As noted previously, the sense capacitors $C_{ref}$ and $C_{sense}$ are connected between the outputs of the inverters 4, 2 and the ground rail GND. The dynamic current consumptions of the inverters 4, 2 are proportional to their respective capacitive loads, as determined by the capacitances of the sense capacitors $C_{ref}$ and $C_{sense}$.

At the beginning of each measurement, the reset switches formed by the PMOS transistors M3 and M4 are closed (logic value of reset signal=1). Accordingly, the voltages at the nodes 14 and 12 are equal to the supply voltage from the power rail $V_{dd}$. At a time $T_{reset}$, the reset switches provided by M3 and M4 are opened (logic value of reset signal=0). At this time, or shortly after, the inverter 4 begins to switch in accordance with the digital clock input CLK. As the inverter 4 begins to switch, discharging of an integration capacitor of a first subcircuit is initiated.

The integration capacitor of the first subcircuit in this example is formed by the decoupling capacitor dcap of the first subcircuit in parallel with the gate capacitance of the transistor M2. Similarly, the integration capacitor of the second subcircuit in this example is formed by the decoupling capacitor dcap of the second subcircuit in parallel with the gate capacitance of the transistor M1. The integration capacitors of the first and second subcircuits may also have small contributions from parasitic capacitances of the components connected to the nodes 14 and 12, respectively.

The discharging of the integration capacitor of the first subcircuit occurs at a rate which is at least partly determined by the capacitance of the reference capacitor $C_{ref}$ in the first subcircuit, since the dynamic current consumption of the inverter 4 is proportional to the capacitive load of the inverter 4, which is determined by the capacitance of the reference capacitor $C_{ref}$.

At a given time after the clock input CLK begins to switch the inverter 4, the clock input CLKD similarly begins to switch the inverter 2 (for the present example, it is assumed that $T_d$ is positive, so that the inverter 4 begins to switch first). In the same way as described above in relation to the operation of the inverter 4, the switching of the inverter 2 initiates discharge of the integration capacitor of the second subcircuit.

The discharging of the integration capacitor of the second subcircuit occurs at a rate which is at least partly determined by the capacitance of the sense capacitor $C_{sense}$ in the second subcircuit, since the dynamic current consumption of the inverter 2 is proportional to the capacitive load of the inverter 2, which is determined by the capacitance of the sense capacitor $C_{sense}$.

As the integration capacitors of each subcircuit discharge, the voltages at the nodes 14 and 12 begin to drop. After a certain amount of time, one of the nodes 14 and 12 will eventually reach a voltage which is low enough to switch on the transistor of the latch 20 (i.e. either M1 or M2) that has its gate connected to that node. By way of example, if the voltage at node 12 drops below the switch-on voltage of the transistor M1, the transistor M1 will switch on. As transistor M1 begins to conduct, the voltage at node 14 of the first subcircuit will begin to return to the voltage at the power rail $V_{dd}$. This increase in voltage at node 14 has the effect of driving up the voltage at the gate of transistor M2, so that the transistor M2 remains switched off. On the other hand, if the voltage at node 14 drops below the switch-on voltage of the transistor M2, then transistor M2 begins to conduct, leading to an increase in the voltage at the node 12 of the second subcircuit and having the effect also of ensuring that transistor M1 remains switched off.

Accordingly, the transistors M1 and M2 operate as a latch. The state of the latch is determined according to which of the nodes 14 and 12 is first to drop below the switch-on voltage of its corresponding PMOS transistor (M2, M1). Thus, by inspecting the state of the latch 20 after it has settled, it is possible to determine which of the two integration capacitors of the circuit 10 has discharged to reach the switch-on voltage of its corresponding transistor in the latch 20 first.

A number of factors may affect the outcome of the race between the two nodes 12, 14 to drop below the switch-on voltage of its corresponding transistor in the latch.

Firstly, and as already noted, the rate of discharge of the integration capacitor is at least partly determined by the capacitance of the sense capacitor of that subcircuit (which may, as already noted, be a reference capacitor). However, it will also be noted that the outcome of the race may also be determined by the length of a delay between initiation of the switching of the inverter 4 of the first subcircuit and initiation of the switching of the inverter 2 of the second subcircuit.

The interplay between these two factors can be exploited to make a comparison between the capacitance of the two sense capacitors. For instance, where the delay is zero, then it may be expected that the subcircuit with the sense capacitor having the largest capacitance would discharge its integration capacitor more quickly, and since both subcircuits have the same amount of time for discharging, it is expected that the subcircuit with the sense capacitor having the largest capacitance would be first to drop below the switch-on voltage of its corresponding transistor in the latch circuit 20. However, when a delay is included in the measurement, this result may be reversed. For instance, it may be that the subcircuit having a sense capacitor with the larger capacitance may still lose the race if the other subcircuit has more time to discharge. In other words, the subcircuit that discharges more slowly may still win the race if it has more time to discharge compared to the other subcircuit. As will be explained in more detail below, the amount of time delay that causes this change in the outcome of the race can yield information about the relative capacitances of the sense capacitors.

The operation of the subcircuits of the sensor circuit of FIG. 1 is described in more detail below in relation to FIGS. 2 and 3.

FIG. 2 shows an example of an equivalent circuit representing the basic principle of operation of one of the subcircuits of a sensor circuit according to an embodiment of the invention. As noted previously, the inverters 2, 4 of each subcircuit in the embodiment of FIG. 1 may include a PMOS transistor and an NMOS transistor. In FIG. 2, the PMOS transistor is represented by the switch $S_1$, while the NMOS transistor is represented by the switch $S_2$.

The capacitor labelled $C_X$ in FIG. 2 represents the sense capacitor of the subcircuit. The capacitor labelled $C_I$ in FIG. 2 represents the integration capacitor of the subcircuit. The integration capacitor can include the decoupling capacitor described relation to FIG. 1, and may also include other contributions as noted above. The node 13 shown in FIG. 2 represents the node of the subcircuit (e.g. either the node 12 or the node 14 in FIG. 1). FIG. 2 also shows a ground rail (GND) of the kind described in relation to in FIG. 1.

The operation of the subcircuit shown in FIG. 2 may include a number of steps as follows:

1. In a first step, the voltage $V_I$ on capacitor $C_I$ is reset to a voltage $V_I(0)$, e.g. using the reset circuit including transistors M3 and M4 as noted above (in the embodiment of FIG. 1, the initial voltage $V_I(0)$ corresponds to $V_{dd}$).
2. In a next step, the switch $S_2$ can be closed. This causes the capacitor $C_X$ to discharge, ($V_X=0$) as both terminals of the capacitor $C_X$ are connected to ground.
3. In a next step, the switch $S_2$ can be opened again (still, $V_X=0$).
4. In a next step, the switch $S_1$ can be closed. This charges the capacitor $C_X$ by transferring charge from the capacitor $C_I$ to the capacitor $C_X$. After the capacitor $C_X$ has been charged, $V_X=V_I$.
5. In a next step, the switch $S_1$ can be opened again (still, $V_X=V_I$).

The operation of the subcircuit can include repetition of steps 2 to 5 indicated above, controlled by the digital clock input received by the inverter of the subcircuit, until the voltage $V_I$ has decreased below a detection threshold voltage $V_D$. The detection threshold $V_D$ may be determined by the switch-on voltage of a transistor (e.g. M1 or M2) of the latch circuit 20 to which node 13 of the subcircuit is connected.

After the $k^{th}$ iteration through steps 2 to 5, the voltage $V_I(k)$ is related to the voltage $V_I(k-1)$ by the charge balance:

$$V_I(k-1)C_I = V_I(k)C_I + V_I(k)C_X \quad 1)$$

Consequently:

$$V_I(k) = \frac{V_I(k-1)}{1+\frac{C_X}{C_I}} = \frac{V_I(0)}{\left(1+\frac{C_X}{C_I}\right)^k} \quad 2)$$

After $k_X$ iterations, $V_I$ eventually reaches the detection threshold voltage $V_D$, so that:

$$V_D = \frac{V_I(0)}{\left(1+\frac{C_X}{C_I}\right)^{k_X}} \quad 3)$$

The number of iterations $k_X$ required to reach the detection threshold voltage is therefore given by:

$$k_X = \frac{\ln\left(\frac{V_I(0)}{V_D}\right)}{\ln\left(1+\frac{C_X}{C_I}\right)} \quad 4)$$

In general, the right-hand-side of equation 4 is an irrational number. To be able to approximate it accurately by the nearest integer $k_X$, with a small relative error, $k_X$ should be much larger than 1.

If it is assumed that for many hardware implementations $V_I(0)$ and $V_D$ are of similar magnitude (e.g. $V_D = 0.5 \times V_I(0)$), then the numerator ($\ln(V_I(0)/V_D)$) on the right hand side of equation 4 will be of the order of magnitude of 1. It follows that for large $k_X$, the denominator ($\ln(1+C_X/C_I)$) on the right hand side of equation 4 should be small ($0 < C_X/C_I \ll 1$). The logarithm in the denominator can be approximated by the first term of its Taylor series:

$$k_X = \frac{C_I}{C_X}\ln\left(\frac{V_I(0)}{V_D}\right) \quad 5)$$

As described in relation to FIG. 1, the capacitance sense circuit includes two subcircuits. Assuming that the other subcircuit also has a sense capacitor $C_y$, and following equations 1 to 5 above (assuming also that M1 and M2 have the same switch-on voltage $V_D$, and that the integration capacitors of the two subcircuits have equal value), then the number of iterations required for the detection threshold to be reached by the other subcircuit is given by:

$$k_Y = \frac{C_I}{C_Y}\ln\left(\frac{V_I(0)}{V_D}\right) \quad 6)$$

And for the nominal value $C_N$ of the sense capacitors:

$$k_N = \frac{C_I}{C_N}\ln\left(\frac{V_I(0)}{V_D}\right) \quad 7)$$

From equations 5 and 6 it follows that:

$$\frac{C_X}{C_Y} = \frac{k_Y}{k_X} \quad 8)$$

The right-hand-side of equation 8 can be rewritten as:

$$\frac{k_Y}{k_X} = \frac{1-\frac{k_X-k_Y}{k_X+k_Y}}{1+\frac{k_X-k_Y}{k_X+k_Y}} \quad 9)$$

In the most challenging case, where $C_X$ and $C_Y$ are distributed in a narrow region around $C_N$, and therefore $k_X \approx k_Y \approx k_N$, we can approximate the unknown number $k_X + k_Y$ by $2k_N$:

$$\frac{k_Y}{k_X} = \frac{1-\frac{k_X-k_Y}{2k_N}}{1+\frac{k_X-k_Y}{2k_N}} \quad 10)$$

Substitution in equation 8 gives:

$$\frac{C_X}{C_Y} = \frac{1-\frac{k_X-k_Y}{2k_N}}{1+\frac{k_X-k_Y}{2k_N}} \quad 11)$$

Solving ($k_X - k_Y$) gives:

$$k_X - k_Y = 2k_N \frac{1-\frac{C_X}{C_Y}}{1+\frac{C_X}{C_Y}} \quad 12)$$

The (also unknown) value of $k_N$ may be estimated from circuit design simulations.

In the embodiment of FIG. 1, the crossing of the detection threshold is not determined for each subcircuit separately. Instead, each subcircuit is connected to the latching circuit 20, and the subcircuit that reaches the detection threshold first will "win the race", and thereby determine the state of the latch 20 after settling.

In accordance with an embodiment of the invention, the voltages over the integration capacitors of the first and second subcircuit can be forced to reach the detection threshold voltage $V_D$ at the same moment in time by initiating discharge of the integration capacitor (e.g. commencing the iteration cycle described in relation to steps 1 to 5 above) in each subcircuit at a different point in time. Discharge of a first of the integration capacitors can be initiated at time T, while discharge of the other integration capacitor can be initiated at time $T+T_D$, where $T_D$ is made equal to $k_X - k_Y$ divided by the clock frequency (which in this embodiment is the same for both clocks).

This may be implemented by delaying the clock CLKD with respect to the clock CLK shown in FIG. 1 by a number of cycles kD, where in a one embodiment kD in general is a rational number. Assuming that $C_X$ and $C_Y$ are connected to the inverters clocked by the clocks CLK and CLKD, respectively, the tripping point where the settled state of that latching circuit flips from 0 to 1, or from 1 to 0, corresponds to a delay given by equation 12.

In one embodiment, this tripping point can be found by scanning the delay kD in fractional steps of a clock period (the same clock period for the two subcircuits) through a range of values that covers the target range of capacitance ratios $C_X/C_Y$. This fractional stepping can be implemented using digital delay lines, digital dividers, counters or a combination of them (an example of this will be described in more detail below in relation to FIG. 5). Although in this way the delay between CLKD and CLK can be varied in fractions of a clock period, the iteration cycle numbers $k_X$ and $k_Y$ themselves may always be integer values.

However, because the latching circuit may respond slowly (i.e. with a settling time slower than or comparable to a clock period) when an integration capacitor voltage reaches its detection threshold voltage a fractional delay of one clock to the other effectively translates into a variation of dwell time of the integration capacitance voltage near the detection threshold voltage. This way, fractional delay steps can be used to determine the latch circuit's tripping point accurately. If the latch circuit's settled state flips at a fractional delay of $k_T$ clock cycles, then the capacitance ratio of the two sense capacitors may be estimated by substituting $k_T$ for $k_X$–$k_Y$ in equation 11:

$$\frac{C_X}{C_Y} = \frac{1 - \frac{k_T}{2k_N}}{1 + \frac{k_T}{2k_N}} \quad 13)$$

where $k_T$ in general can be positive or negative.

FIG. 3 illustrates the wave forms of the sensor circuit shown in FIG. 1 as a function of time. In particular, the line 22 in FIG. 3 corresponds to the voltage at node 14 of the first subcircuit and the line 24 shows the voltage at the node 12 of the second subcircuit in FIG. 1. In this example, it is assumed that a delay $T_d$ is introduced so that initiation of the discharge of the integration capacitor of the second subcircuit begins later than discharge of the integration capacitor of the first subcircuit (i.e. $T_d$ is positive). It is also assumed that the sense capacitor $C_{sense}$ has a greater capacitance than the sense capacitor $C_{ref}$ in FIG. 1.

In FIG. 3, at time $T_{reset}$ the initially closed transistors M3 and M4 are opened to leave the latch circuit 20 in an initialized state such that the voltages at the nodes 14 and 12 are equal to $V_{dd}$. At $T_{reset}$, the inverter 4 of the first subcircuit begins to switch under the control of the digital clock input CLK. As shown in FIG. 3 (see the line labelled 22), this initiates discharge of the integration capacitor of the first subcircuit such that the voltage at node 14 of the first subcircuit begins to drop. As shown schematically by the line 26 in FIG. 3, the drop in voltage at the node 14 occurs in a number of steps, each step corresponding to a discharge of the integration capacitor by the transfer of charge from the integration capacitor to the sense capacitor $C_{ref}$ as described above in steps 2-5 relating to FIG. 2. Although the discharging of the integration capacitor occurs as a series of steps, this discharging may be approximated by a linear decay (line 22 for node 14), particularly if a large number of iterations are required to discharge the integration capacitors until one of the corresponding transistors of the latch circuit 20 is switched on.

After a delay $T_d$, the inverter 2 of the second subcircuit begins to switch also, under the control of the digital clock input CLKD. As shown by the line labelled 24 in FIG. 3, this initiates discharge of the integration capacitor of the second subcircuit, leading to a drop in voltage at the node 12 of the second subcircuit. Again, and as shown by the line 28 in FIG. 3, the discharge of the integration capacitor of the second subcircuit occurs as a series of steps, although this may be approximated by a linear decay as shown by the line labelled 24.

After the discharge of each integration capacitor has been initiated, they both continue to discharge for a certain amount of time until one of the nodes 14, 12 drops to a voltage that is low enough to switch on either the transistor M2 or the transistor M1, respectively. The time at which a first of the two nodes 14, 12 drops to a sufficiently low voltage is denoted in FIG. 3 as time $T_{eval}$. At this time, and as already explained above, the race to drop to the switch-on voltage of one of the transistors of the latch circuit 20 is won either by the first subcircuit or the second subcircuit and the result is stored by the latch circuit 20.

In the present example, the outcome is that the voltage at node 12 of the second subcircuit is first to drop to the switch-on voltage of its associated latch transistor (namely M1). This switches on transistor M1 so that the voltage at node 14 increases to $V_{dd}$. Since the gate of transistor M2 is connected to node 14 of the first subcircuit, this increase in voltage at node 14 ensures that transistor M2 remains switched off. Accordingly, the voltage at node 12 continues to drop. The increase in voltage at node 14 and the continuing decrease in voltage at node 12 is illustrated in FIG. 3 after time $T_{eval}$. In some examples, it may be that the race is rather close, so that the transistors M1 and M2 may begin to switch on at approximately the same time. This can result in a settling period in the latch circuit 20, during which the outcome of the race is determined as the two transistors M1 and M2 compete to switch on first. This period can be seen in FIG. 3 shortly after time $T_{eval}$ and before the lines 22 and 24 diverge.

FIG. 3 is illustrative in the sense that although the inverter 4 begins to switch first so that the integration capacitor of the first subcircuit begins discharging before the integration circuit of the second subcircuit, the voltage at node 12 of the second sub-circuit still reaches the switch-on voltage of transistor M1 before the voltage at the node 14 reaches the switch-on voltage of the transistor M2. This is because the capacitance of the sense capacitor $C_{sense}$ second subcircuit is larger than the capacitance of the sense capacitor $C_{ref}$ of the first subcircuit (which causes the integration capacitor of the second subcircuit to discharge more quickly). The value of $T_d$ has been chosen for illustrative purposes in FIG. 3 such that the second subcircuit only just manages to win the race to discharge its integration capacitor such that the voltage at the node 12 drops to a level at which M1 is switched on.

FIG. 3 also illustrates that there are only two possible outcomes to the race. Either the voltage at node 12 of the second subcircuit or the voltage at node 14 of the first subcircuit will, after time $T_{eval}$, go to $V_{dd}$ (and the voltage at the other node will continue to decrease). With reference again to FIG. 1, the inverter 6 at the output of the circuit 10 has an input which will either receive voltage $V_{dd}$ or a substantially lower voltage in accordance with the outcome of the race. The output 6 therefore has two possible states and is thus a digital output. Accordingly, signals passing from the circuit 10 along potentially long signal lines in a sensor array need not suffer from the degradation associated with analogue circuitry.

Having described an example of the internal workings of an example sensor, there will now be described example embodiments of a secure electronic apparatus.

Figure 4A:
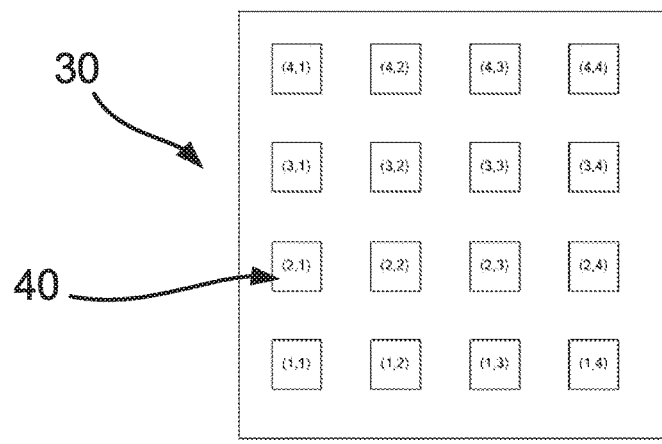
FIG. 4A shows a sensor array that may be included in a secure electronic apparatus in accordance with an embodiment of this invention.

FIG. 4A shows an array 30 of sensors 40, which may be sensors that include circuits of the type described above in relation to FIGS. 1 to 3. In this example, the array 30 of sensors 40 includes 16 sensors 40 arranged in four rows and four columns. It will be appreciated that any number of sensors may be included in the array 30 and indeed that in some examples a very large number of sensors may be present (for instance, hundreds or even thousands of sensors). The sensors may be distributed in an integrated circuit (e.g. an IC of a secure element)

The layout of the various possible types of sensor array described herein are logical layouts and need not necessarily correspond to the actual physical position of each sensor. The array 30 in this example is a square array. However, it will be appreciated that other kinds of array me be used.

Each sensor 40 in the array 30 can have an input that is operable to receive an input signal. As already noted, where the sensors 40 are of the kind described above in relation to FIGS. 1 to 3, the input signal can correspond to the clock signals CLK and CLKD and an input signal value received by the sensor can correspond to the delay (e.g. $T_D$) between the clock signals. The input signals may be digital input signals (for instance, the clock signals CLK and CLKD may be digital clock signals as noted above).

Each sensor 40 in the array 30 can also have an output that is operable to output a digital signal. The digital signal is determined by a value of the input signal and by a physical quantity that is sensed by the sensor 40. In examples in which the sensors 40 are of the kind described above in relation to FIGS. 1 to 3, the output can correspond to the output of the inverter 6 shown in FIG. 1 and the digital signal that is outputted can be a value of either 0 or 1 indicating the winner of the race between the sub-circuits to discharge their integration capacitors such that a voltage at either node 12 or node 14 drops below the switch-on voltage of its corresponding PMOS transistor in the latch circuit 20.

The digital signal outputted by each sensor 40 is indicative of whether the value of the input signal exceeds a detection threshold value for that sensor. The digital signal that is outputted by the sensor thus depends on the value of the input signal. In some examples, the outputted digital signal has a value that is 0 where the value of the input signal is lower than the detection threshold value for the sensor and 1 where the value of the input signal exceeds the detection threshold value for the sensor. In such examples, it will be appreciated that as the value of the input signal increases, at some point the section threshold value for the sensor will be exceeded. At this point, the outputted digital signal will change from 0 to 1.

With reference again to the example sensor circuit described in relation to FIGS. 1 to 3, where such sensors are used to implement a plurality of sensors in a secure electronic apparatus, the detection threshold value for each sensor may correspond to the value of the delay $T_D$ between the clocks CLK and CLKD that causes the outcome of the race between the sub-circuits of the sensor circuits to change as already noted.

In a real secure electronic apparatus including an array of sensors, it will be appreciated that even if each sensor is manufactured to have the same configuration, manufacturing variations between the individual sensors and the components thereof may generally result in the sensors in the array having detection threshold values that vary randomly. The random variation of the detection threshold values of the sensors can, for a secure electronic apparatus, form a fingerprint that is unique to the array and which can be exploited to detect tampering. A change in the detection threshold value for one or more of the sensors in the array may be indicative of a physical attack against the integrated circuit embodying the secure electronic apparatus. Accordingly, detecting any such changes in the detection threshold value(s) can allow such attacks to be identified.

Figure 4B:
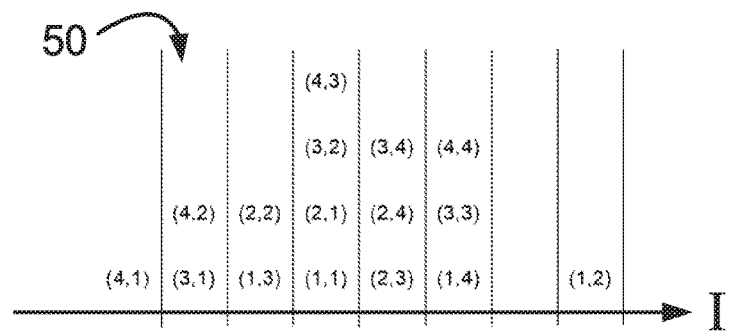
FIG. 4B shows an example distribution of the digital outputs of a sensor array of the kind shown in FIG. 4A.

FIG. 4B illustrates the variation in detection threshold values for the sensors 40 of the array 30 shown in FIG. 4A. The horizontal axis in FIG. 4B corresponds to the value of the input signal. Each sensor is binned in one of a plurality of bins 50 according to the input signal value at which the detection threshold value for that sensor is reached. Precise determination of the detection threshold value for each individual sensor may not generally be required and the binning approach shown in FIG. 4B may be sufficient for identifying changes in the detection threshold value. Thus, in FIG. 4B, each bin contains an indication of the sensor or sensors (denoted by the row and column number of the array shown in FIG. 4A) that change their output signal value in the interval between the input signal values forming the boundaries between the adjacent bins. In this way, embodiments of this invention can allow the approximate detection threshold values for each sensor to be determined by applying a finite set of input signal values to the inputs of the sensors and recording the digital signals that are outputted for each input signal value.

It is generally expected that manufacturing variations would lead to an approximately Gaussian distribution of detection threshold values (the example histogram shown in FIG. 4B is consistent with this).

In an alternate embodiment, the detection threshold values for each sensor in the array may in principal be determined by applying a ramped input signal value to each sensor and recording the point at which the value of the digital signal that is outputted changes. This would generally result in a unique detection threshold value for each sensor in the array as indicated below in Table 1.

TABLE 1

| | Threshold value read out | | | |
|---|---|---|---|---|
| | Column 1 | Column 2 | Column 3 | Column 4 |
| Row 4 | threshold value A | threshold value E | threshold value I | threshold value M |
| Row 3 | threshold value B | threshold value F | threshold value J | threshold value N |
| Row 2 | threshold value C | threshold value G | threshold value K | threshold value O |
| Row 1 | threshold value D | threshold value H | threshold value L | threshold value P |

The amount of data produced by such a measurement may be relatively large however, particularly for sensor arrays including hundreds or even thousands of sensors. By incrementing the input signal value in a stepwise fashion as noted above, and assigning the sensors to a histogram of the kind shown in FIG. 4B, the amount of data produced for detecting the fingerprint associated with the statistical variation in the detection threshold values of the sensors can be reduced.

As noted above, a change in the detection threshold value for one or more of the sensors in the array 30 may be indicative of tampering with a secure electronic apparatus incorporating the array. An example of this is represented in FIG. 4C.

Figure 4C:
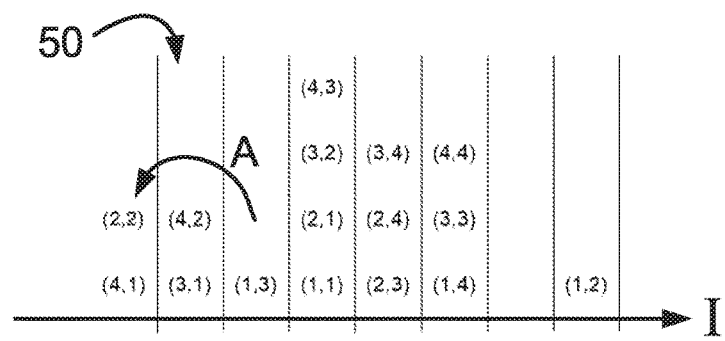

FIG. 4C shows a similar histogram to that shown in FIG. 4B. However, in this example, the detection threshold value of the sensor at position (2,2) in the array 40 shown in FIG. 4A has changed (to a lower bin corresponding to a lower detection threshold value) by tampering. Note that this change causes a change in the histogram such that the overall distribution of the sensors according to their detection threshold value is different compared to that of the pre-tampering histogram shown in FIG. 4B. In principle, comparison of a histogram of the kind shown in FIG. 4C with a stored, pre-tampering histogram (e.g. that is determined during manufacture) may be used to determine that the secure electronic apparatus has been tampered with.

Each bin in the histogram may be viewed as a combined output result of a measurement routine involving applying a plurality of input signal values to the inputs of the sensors. For instance, the combined output results of a measurement routine can be formed by, for each bin, noting the sensors that reached their detection threshold value in the interval between a first applied input signal value (corresponding to the lower boundary of each bin) and a second applied input signal value (corresponding to the upper boundary value of the bin) and by binning the identity of each sensor that has reached its detection threshold value in that bin. Each combined output result or bin in a histogram of the kind shown in FIG. 4C can then be compared with a corresponding combined output result of a set of pre-tampering combined output results stored in a memory.

Figure 5:
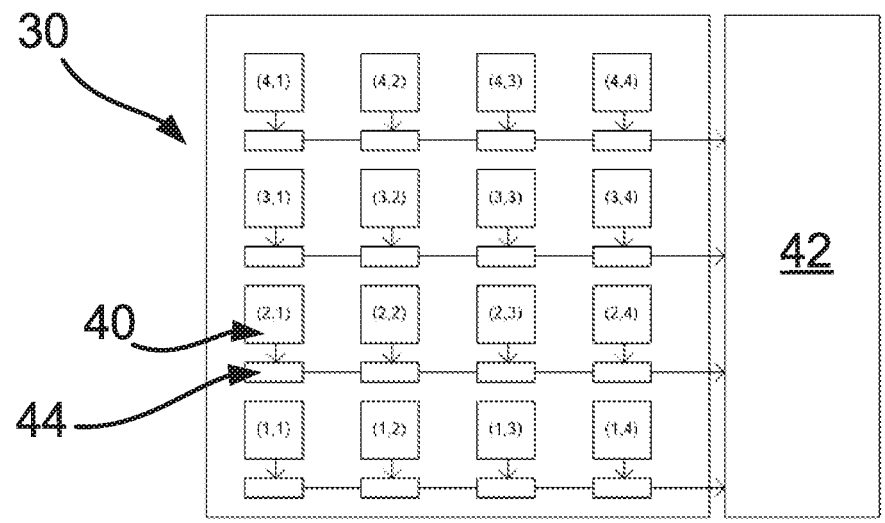
FIG. 5 shows an example arrangement for reading out the digital outputs of the sensor array shown in FIG. 4A in accordance with an embodiment of this invention.

FIG. 5 shows an example arrangement for reading out the digital signals from the sensors 40 in a sensor array 30 of the kind shown in FIG. 4A. In this example, the secure electronic apparatus includes a plurality of shift registers 44 that are arranged to shift the digital signal values outputted by each sensor into a memory 42. In the example of FIG. 5, the shift registers 44 are arranged in rows corresponding to the rows of sensors 40 although it is envisaged that the shift registers may instead be arranged to retrieve data in a column wise fashion.

In sensor arrays that include a large number of sensors, it will be appreciated that a measurement routine for determining the detection threshold values of each sensor and for forming the combined output results may be very large and the associated amount of computational power that is required to process them may be correspondingly large.

For the purposes of detecting tampering, it is envisaged that a plurality of input signal values may be applied to the sensors 40 (for example, in a sweep from a low input signal value to a high input signal value in a series of increments corresponding to the bins of the histograms shown in FIGS. 4B and 4C) and that for each input signal value the shift registers 44 can be used to determine the values of the digital signals outputted by the various sensors 40. These values can be recorded in the memory 42. For each incremental readout in the sweep, those sensors 40 in the array having a digital output "1" may be identified and binned in the corresponding bin in a histogram of the kind shown in FIGS. 4B and 4C. It is envisaged that a method of this kind would involve only binning those sensors that have newly changed their digital output value to "1" since the previous increment, to allow correct binning of the sensors. The process of identifying those sensors 40 in the array 30 that have a digital signal value output of "1" and binning those sensors can allow a combined output result comprising the contents of each bin to be determined.

The duration of the overall readout of the outputs of the sensors 40 in the measurement routine in the example of FIG. 5 would scale with the number of bins multiplied by the number of columns in the array 30. The amount of data to be processed for intrusion detection would scale with the number of bins multiplied by the number of sensors 40. It will be appreciated that for large sensor arrays, the duration of the readouts and the amount of data to be processed may be correspondingly large.

In principle however, it is the overall distribution of the detection threshold values in the array that may be used as the fingerprint for determining whether the secure electronic apparatus has been tampered with. It may not, as a matter of principal, be necessary to know the exact or approximate detection threshold value for each and every sensor in the array and to compare that detection threshold value with a value that is known to correspond to a pre-tampering state of that sensor. For detection of tampering, it may be sufficient to know that at least one or more of the sensors in the apparatus has a detection threshold value that has changed. It also may not be necessary to know exactly which sensors have been tampered with, to know exactly how many sensors have been tampered with and/or to know the extent to which each sensor has been tampered with. In some embodiments, these considerations may allow the task of detecting tampering with a secure electronic apparatus including a plurality of sensors to be simplified.

For instance, instead of identifying the individual sensors 40 in the array 30 that fall in each bin of a histogram of the kind described above in relation to FIGS. 4B and 4C, the combined output result for each input signal value applied to each sensor during a measurement routine can simply be a value indicating the number of sensors for which the detection threshold value has been exceeded in that bin. Readout and storage of each combined output result may thus be greatly simplified compared to the approach described above in relation to FIGS. 4B and 4C.

Figure 6:
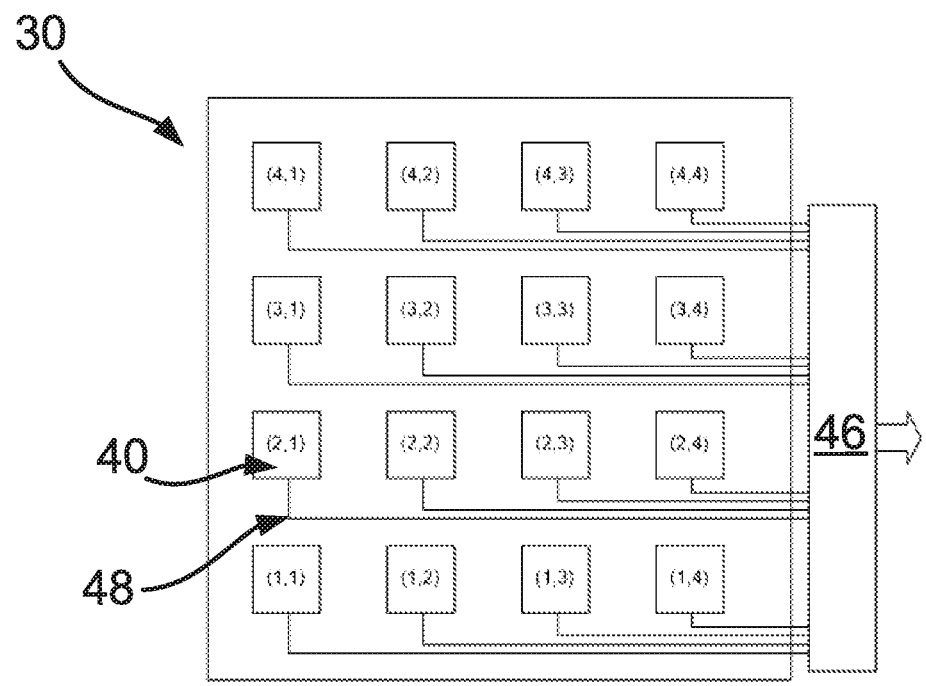
FIG. 6 shows another example arrangement for reading out the digital outputs of the sensor array shown in FIG. 4A in accordance with an embodiment of this invention.

FIG. 6 shows an array 30 of sensors similar to that described above in relation to FIG. 4A. In this example however, the output of each sensor 40 is connected by a connections 48 to a summing element 46. In use, the summing element 46 may sum the outputs of each sensor 40 in the array 30 for each input signal value. The secure electronic apparatus can, in this way, determine the number of sensors 40 in the array 30 that have reached their detection threshold value, at each of a plurality of input signal values. The combined output result of a measurement routine in this embodiment can correspond to the number of sensors 40 for which the detection threshold value is exceeded in the interval between adjacent input signal values. Thus, the combined output result for an $n^{th}$ input signal value may be a value indicating the number of sensors for which the detection threshold value has been exceeded compared to the number of sensors for which the detection threshold value was exceeded for the previous input signal value.

Figure 7A:
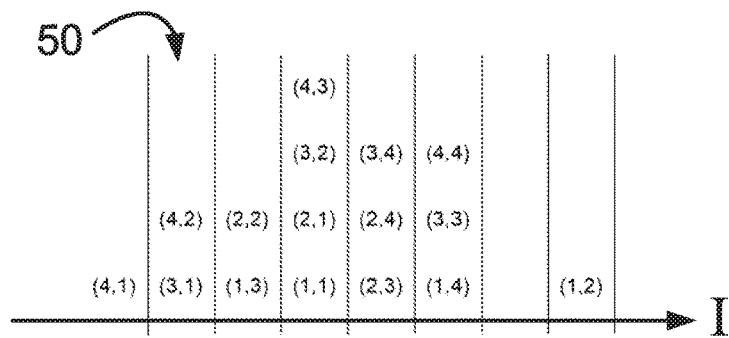
FIGS. 7A and 7B show an example of a set of combined output results for a plurality of input signal values in accordance with an embodiment of this invention.
Figure 7B:
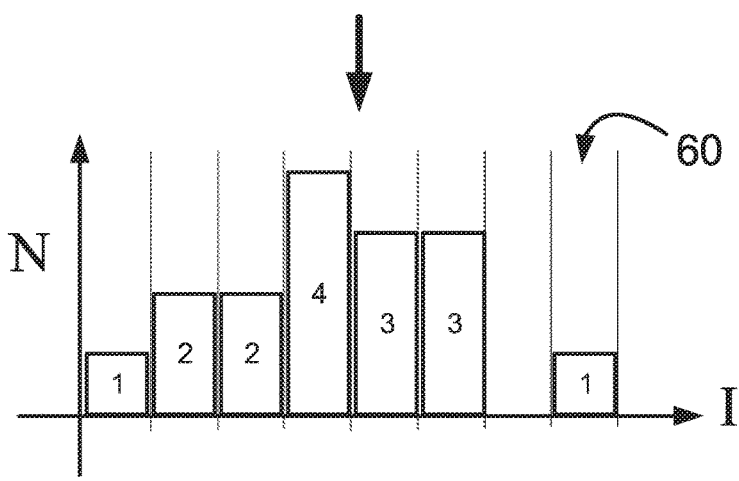

By recording the combined output result for a plurality of input signal values, a histogram of the kind shown in FIG. 7B can be formed. Comparison of the histograms shown in FIGS. 7A and 7B (note that the former corresponds to the histogram of FIG. 4B) reveals that the histogram in FIG. 7B does not contain information identifying each and every sensor, but instead records the number of sensors N having a detection threshold value falling within each respective bin 60. In this example, the combined output result for each input signal may therefore be a simple numerical value in comparison to the detailed information denoting the contents of each of the bins.

As will be appreciated from FIGS. 6 and 7, the approach in this embodiment may allow the relatively complicated shift register 44 arrangement shown in FIG. 5 and its associated long readout times to be replaced with a simpler measurement routine using the summing element 46. Note that the storage of the combined output results for each bin 60 on the lower histogram of FIG. 7 may also require less storage space than would be required to store the contents of each bin 50 in the histogram shown in FIG. 7A. The set of combined output results stored in memory corresponding to a pre-tampering state may also require less space. Furthermore, comparison of the numerical values of the combined output results may require less computational power.

With reference to FIG. 7B, a change in the detection threshold value of the sensor (2,2) similar to that described above in relation to FIG. 4C, would result in the first bin (at the far left of the histogram) having a combined output result of 2 and the third bin having have a combined output result of 1. Assuming that the set of combined output results stored in the memory of the secure electronic apparatus were substantially as shown in FIG. 7B, this difference in the combined output results for the first and third bins would allow the tampering with the sensor (2,2) to be detected.

Because the assignment of responses of the sensors to each bin in the histogram described herein is based on the change in output of the sensors compared to that in a lower bin, instead of counting the number of sensors occupying each bin, instead it may be determined when going from one measurement to another whether there is a difference in the number of sensors assigned to each bin. In this way, the summing element in FIG. 46 may be replaced with a differentiating element (for instance, a XOR gate). Example embodiments following this alternative approach will be described below.

Figure 8:
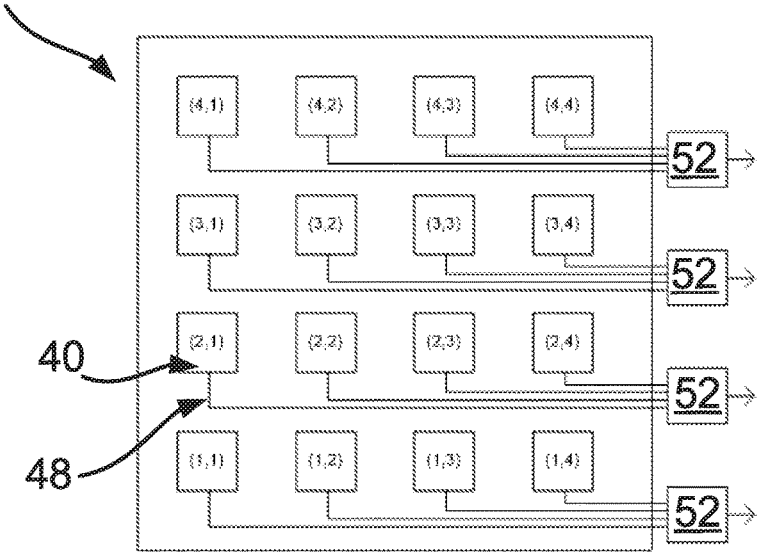
FIG. 8 shows a further example arrangement for reading out the digital outputs of the sensor array shown in FIG. 4A in accordance with an embodiment of this invention.

FIG. 8 shows an array 30 of sensors 40 similar to that already described above. However, in this example embodiment, the array 30 is provided with a plurality of XOR gates 52. In this example, each XOR gate 52 is connected using connections 48 to the outputs of each of the sensors 40 in a corresponding group of sensors of the array 30. In this particular example, each group corresponds to a row of sensors 40 in the array 30. However, it will be appreciated that the groups of sensors need not necessarily correspond to rows of sensors in the array but may instead for instance correspond to columns of the sensors in the array, or indeed to any other logical group.

In this example, the combined output result for each input signal value may be formed by a digital word comprising a plurality of bits. Each bit of the digital word may correspond to the output of a respective one of the XOR gates 52. Accordingly, each bit of the digital word may correspond to a respective one of the groups of sensors 40 (again, in the arrangement of FIG. 8, each group corresponds to a row of sensors 40). Each bit of the digital word of the combined output results is determined by XOR'ing the digital signals outputted by the sensors 40 in the group corresponding to that bit.

Figure 9A:
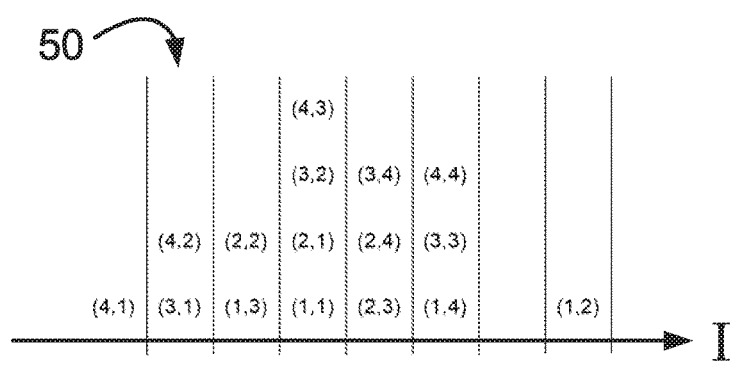
FIGS. 9A and 9B show another example of a set of combined output results for a plurality of input signal values in accordance with an embodiment of this invention.
Figure 9B:
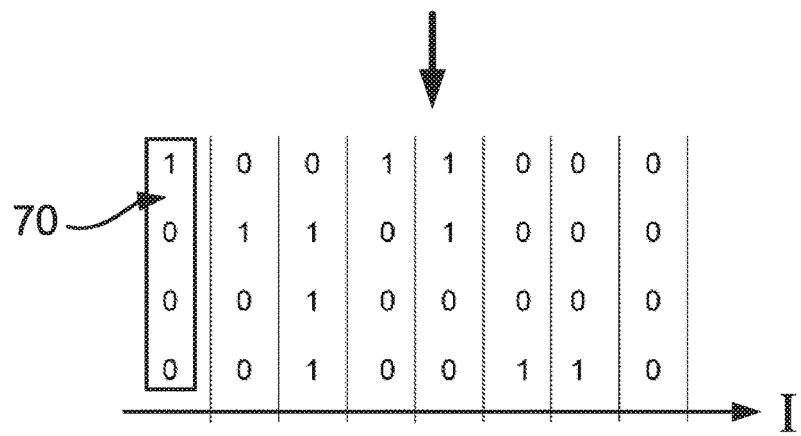

FIG. 9 compares the combined output results of a measurement routine in the present embodiment with those of the kind described above in relation to FIG. 4B. In FIG. 9B, each combined output result according to the present embodiment forms a digital word 70. Since there are four groups in FIG. 8 (i.e. four rows of sensors 40) each digital word 70 includes four bits.

From FIG. 9B it can be seen that each digital word 70 corresponds to the XOR'ed outputs of the rows of sensors 40 shown in the array 30 in FIG. 8, given the detection threshold values binned in the histogram in FIG. 9A.

By way of example, the first digital word at the left hand side of FIG. 9B is "1000" since in the lowest bin in the histogram of FIG. 9B, the only sensor in the array that has reached its detection value (and which therefore outputs value "1") is the sensor (4,1) (whereby the uppermost XOR gate 52 in FIG. 8 reads output "1" while the other three XOR gates 52 all have output "0").

The next digital word in FIG. 9B is "0100". This digital word corresponds to the output of the XOR gates 52 in the situation indicated in the first two bins of the histogram of FIG. 9A in which each of the sensors (4,1), (4,2) and (3,1) have reached their detection threshold value while none of the other sensors in the array 30 have reached their detection threshold value. In such a configuration, the upper XOR gate 52 shown in FIG. 8 outputs value "0" since two of the sensors 40 in the uppermost row in FIG. 8 output value "1". The second bit of the digital word in this configuration has value "1" since only one of the sensors 40 in the second row of the array 30 in FIG. 8 has digital value "1". The other two bits of the digital word are both "0", since none of the sensors in the bottom two arrays have reached their detection threshold value such that all of the sensors in the lower two rows shown in FIG. 8 output value "0".

Comparison of the remaining digital words in the diagram shown in the lower half of FIG. 9 with the histogram shown in FIG. 9A reveals that changes in the number of sensors 40 in each row of the array 30 that have reached their detection threshold value for each incremented input signal value may be detected and recorded using the XOR'ed outputs of the XOR gates 52 shown in FIG. 8. Thus, for tamper detection, the total number of sensors 40 for which the detection threshold value has been reached at each incremented input signal value need not be recorded using an arrangement of the kind shown in FIG. 8. As already mentioned above, it is envisaged that it is not strictly necessary to know the overall number of sensors having a given approximate detection threshold value, but instead it may be merely sufficient to record that a change in the number of sensors in each bin has taken place.

Figure 10A:
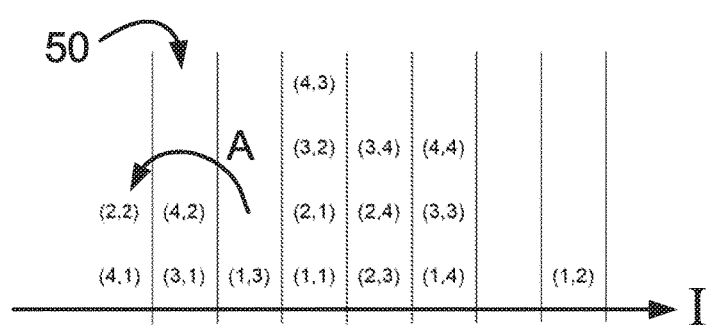

Thus, comparison of the combined output results of the kind shown in FIG. 9B, in which each combined output result corresponds to one of the digital words 70, with a set of stored combined output results that have been derived in a similar way (i.e. pre-tampering) may reveal that tampering has occurred. An example of this will be described below in relation to FIG. 10.

Figure 10B:
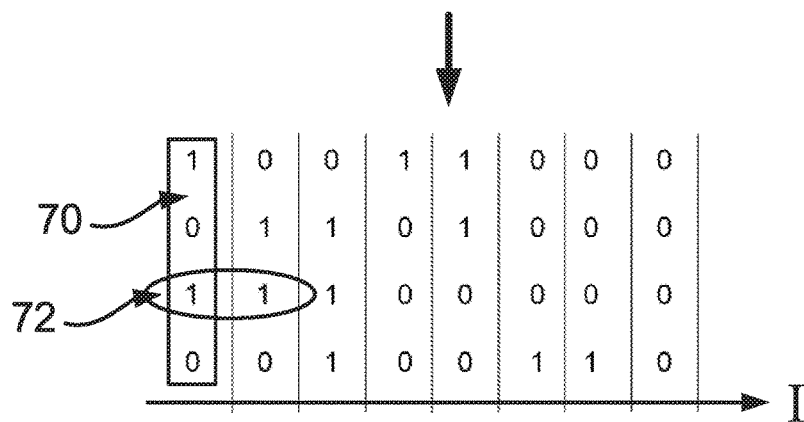

In FIG. 10, it is again assumed that tampering has caused sensor (2,2) to have a lower detection threshold value than in the pre-tampering condition. If the methodology described above in relation to FIGS. 4B and 4C were used, this would correspond to the sensor (2,2) moving from the third bin to the first bin in the histogram in FIG. 10A (this is shown in FIG. 10B using the arrow labelled "A"). The change in the detection threshold value of sensor (2,2) also leads to a change in the combined output results for the measurement routine of the present embodiment, as described below in relation to FIG. 10B.

In particular, because sensor (2,2) has a lower detection threshold value, when the input signal value for determining the first digital word in FIG. 10B is applied, both sensors (4,1) and (2,2) have logic value "1" so that the digital word for that combined output result is "1010" instead of "1000". The second digital word shown in the lower part of FIG. 10 now has the value "0110" instead of "0100". Comparison of the combined output results comprising each of the digital words 70 shown in FIG. 10 with a stored set of combined output results comprising corresponding digital words from the pre-tampering state would reveal that the bits indicated by the reference number 72 in FIG. 10B have changed, and would allow a determination to be made that tampering has occurred.

Although the approach described above may simplify the task of performing a measurement routine for detecting tampering of a secure electronic apparatus, it is possible that certain modes of tampering, which cause changes in the detection threshold value of more than one sensor per group (for instance, per row) may be masked. In other words, where more than one sensor per group is tampered with, the XOR'ed outputs of the sensors 40 may be the same as the pre-tampering set of combined output results stored in the memory. An example of this will be described below in relation to FIGS. 11A and 11B.

Figure 11A:
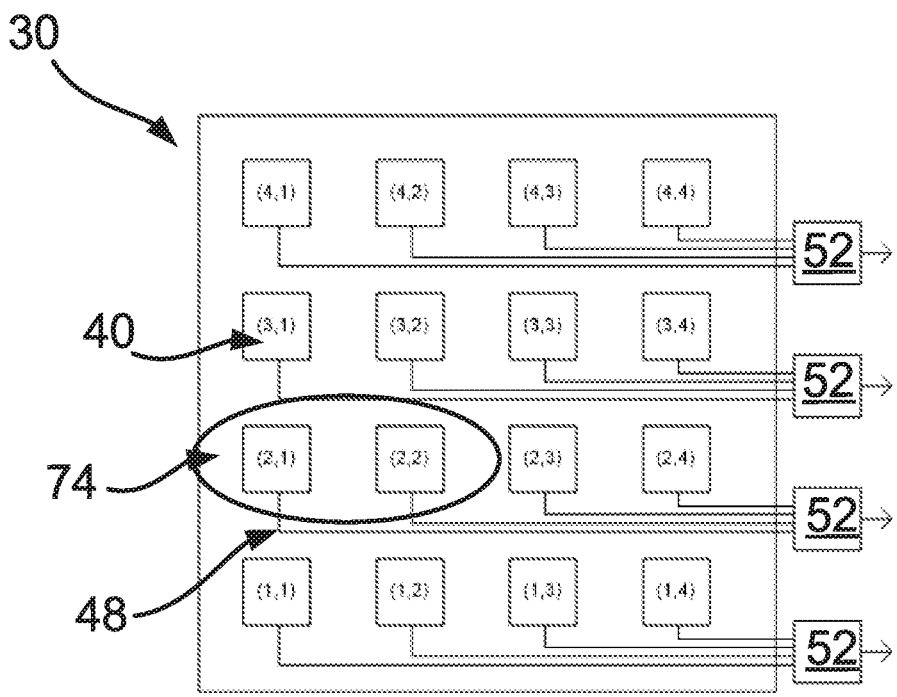
FIGS. 11A and 11B illustrate how tampering with a secure electronic apparatus may potentially be masked.
Figure 11B:
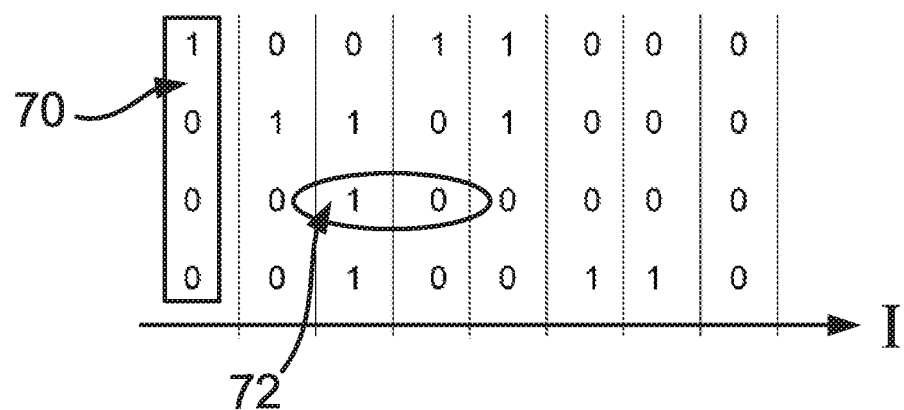

In FIG. 11A, it is assumed that the two sensors indicated using the reference numeral 74 (namely sensors (2,1) and (2,2)) have been tampered with such that their detection threshold values are interchanged compared to those described above in relation to the histogram shown in FIG. 4B. This would lead to combined output results comprising a set of digital words 70 as shown in FIG. 11B. Note that the bits of the combined output results indicated by the reference numeral 72 in FIG. 11B are "10", and that this matches the pre-tampering condition shown in FIG. 9B. Accordingly, although two of the sensors 40 in the array 30 have been tampered with, no overall change in the combined output results arises from this tampering. Comparison with the combined output results with a set of combined output results stored in memory would not, in such an example, allow the tampering with the sensors (2,1) and (2,2) to be determined.

Figure 12:
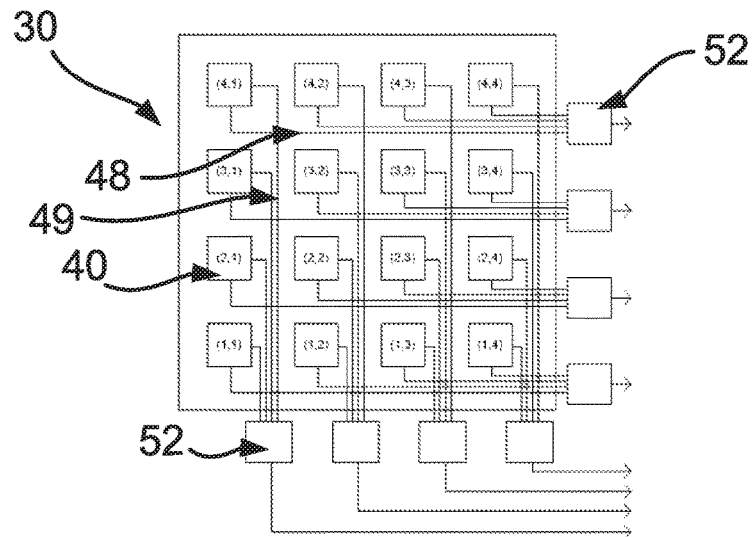
FIG. 12 shows another example arrangement for reading out the digital outputs of the sensor array shown in FIG. 4A, in accordance with an embodiment of this invention.

In order to address this, the arrangement of the XOR gates 52 shown in FIGS. 8 and 11A may be replaced with an arrangement of the kind shown in FIG. 12. In FIG. 12, the groups of sensors 40 are allocated such that each sensor 40 is a member of more than one group. In the particular example shown in FIG. 12, there are eight groups. Four of the groups correspond to each of the four respective columns of sensors 40, while the other four groups correspond to the respective four rows of sensors 40. The outputs of each sensor 40 in the array 30 are connected using connections 48, 49 to XOR gates 52 in a manner similar to that described above. The combined output result for each input signal value in this example comprises a digital word having eight bits, where each bit corresponds to the output of a respective one of the XOR gates 52.

By allocating each sensor 40 to more than one group, a cross check can be made to defend against attacks that involve tampering with more than one sensor per group.

Figure 13A:
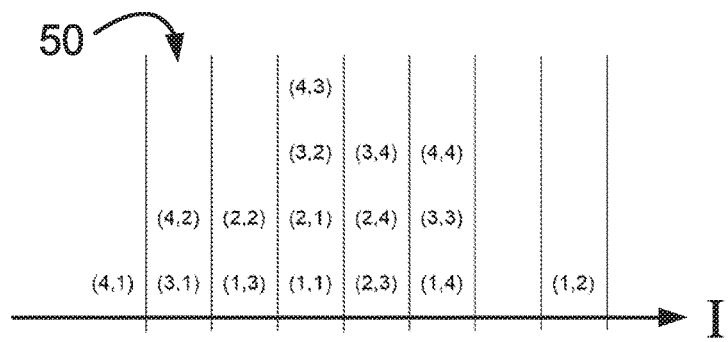
FIGS. 13A and 13B show a further example of a set of combined output results for a plurality of input signal values in accordance with an embodiment of this invention.
Figure 13B:
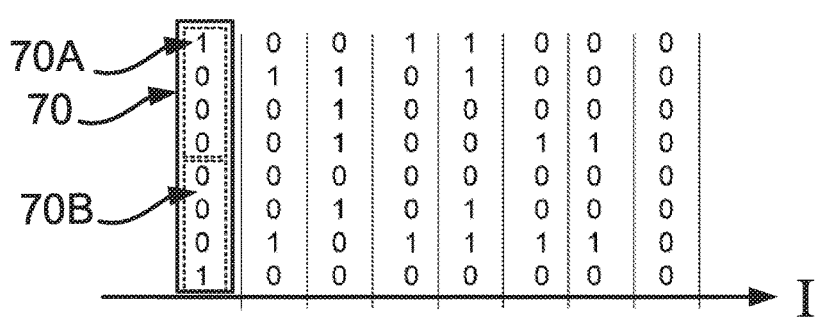

FIG. 13B shows an example of the combined output results produced by the arrangement shown in FIG. 12. FIG. 13A again shows a histogram of the kind shown in FIG. 4B for comparison. Note that each digital word 70 of the combined output results in this example includes two parts. A first part 70A corresponds to the outputs of the XOR gates 52 shown in FIG. 12 that are connected to the groups comprising rows of sensors 40 in the array 30, while a second part 70B corresponds to the outputs of the XOR gates 52 that are connected to the groups comprising columns of sensors 40 in the array 30.

Figures 14, 15:
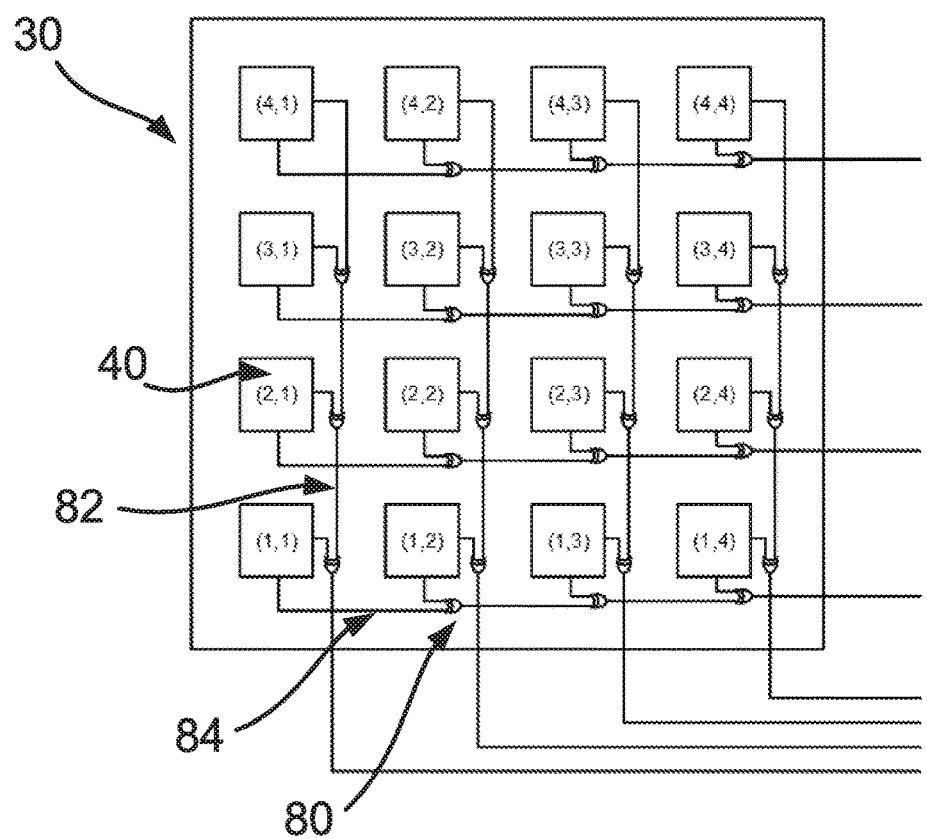

Returning to the above mentioned example in which the detection threshold values of the sensors (2,2) and (2,1) are interchanged during tampering, this would lead to a set of combined output results as shown in FIG. 14. Comparison of the combined output results in FIG. 13B (which correspond to the pre-tampering condition) with those shown in FIG. 14 reveals that the bits indicated by the reference numeral 76 in FIG. 14 have changed from "0" to "1". The change in these bits, detected by the provision of the XOR gates 52 connected to the groups corresponding to columns of sensors 40 of the array 30 as shown in FIG. 12 (but invisible to the XOR gates 52 connected to the logical groups comprising the rows of sensors 40) can allow this mode of tampering to be detected.

Referring again to FIG. 12, it can be seen that a relatively large number of signal lines 48, 49 are required to connect the outputs of the sensors 40 to the XOR gates 52. FIG. 15 illustrates an alternative embodiment in which the XOR'ing of the outputs of the sensors 40 in the array 30 may be performed by local XOR gates 80. The XOR gates 80 and the lines 82, 84 can form chains of XOR gates, wherein a first input of each XOR gate is connected to an output of one of the sensors in the array and wherein a second input of at least some of the XOR gates is connected to an output of a preceding XOR gate in the chain. Some of the XOR gates in the chain may not be connected to a preceding XOR gate. For instance note that neither of the XOR gates shown in FIG. 15 that are connected to the outputs of the sensor (4,1) have an input connected to an output of a preceding XOR gate in the chain. Comparison of the arrangement shown in FIG. 15 with the arrangement shown in FIG. 12 reveals that although the arrangement of FIG. 15 may require the use of a larger number of XOR gates, the number of lines required for routing the outputs of the sensors of the array 30 is substantially reduced, so that the connections to the sensors 40 are simplified. This simplification can be particularly significant in sensor arrays including a large number of sensors, for instance where a sensor array includes hundreds or even thousands of sensors.

Figure 16:
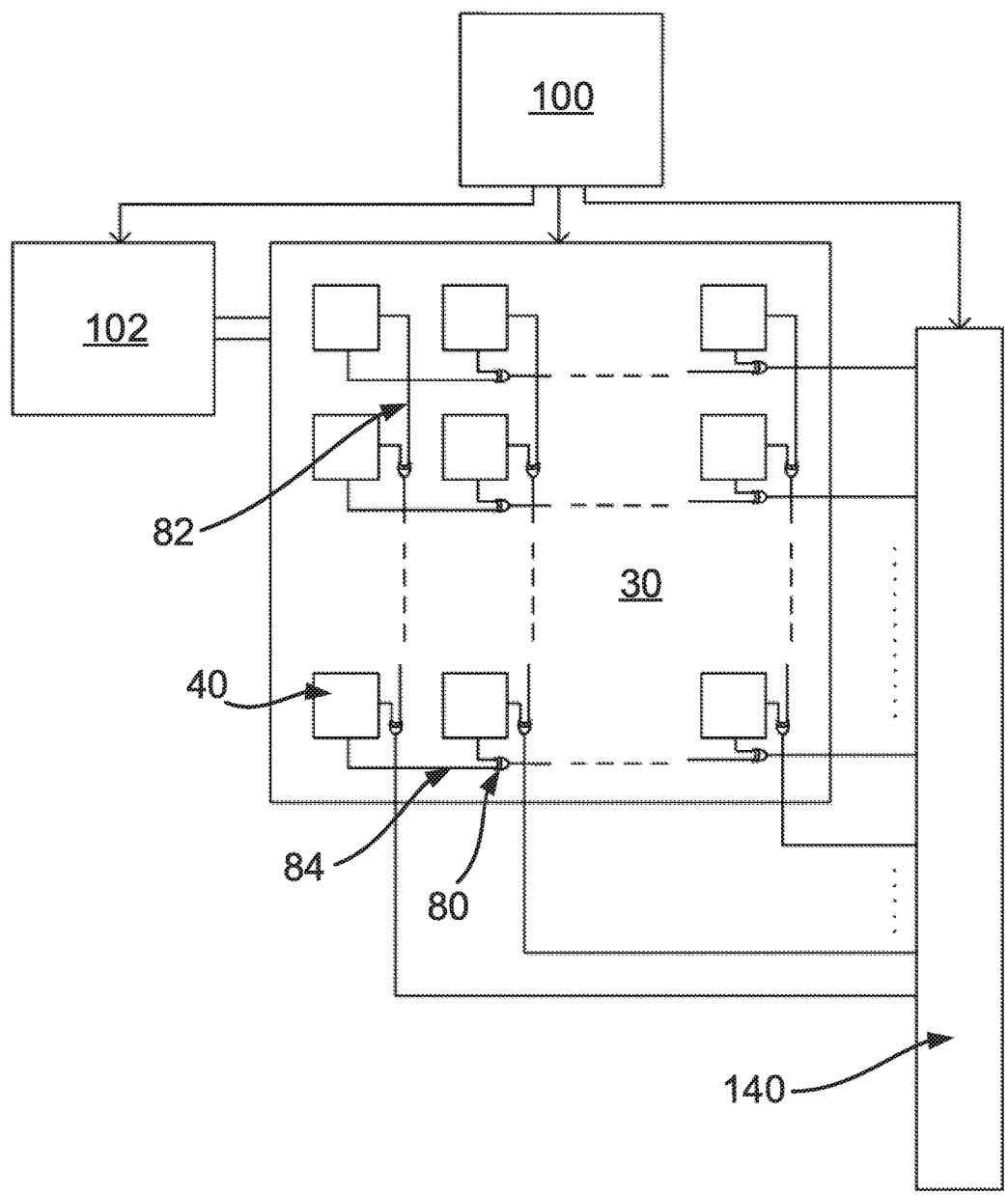
FIG. 16 shows a secure electronic apparatus in accordance with an embodiment of the invention.

FIG. 16 shows an example embodiment of a secure electronic apparatus. The secure electronic apparatus is operable to perform a measurement routine using methodology of the kind that has previously been explained in relation to the earlier embodiments. In the example embodiment shown in FIG. 16, the measurement routine may be automated so that the amount of control that is required to perform tamper detection is limited. This can free up resources of a processor of the secure electronic apparatus so that it does not need to expend resources on the performance of the measurement routine or at least so that the amount of processing power that is required of the processor itself is reduced.

The secure electronic apparatus shown in FIG. 16 includes an array 30 comprising a plurality of sensors 40. The array 30 is of the kind described above in relation to FIG. 15, but it will be appreciated that any of the previously described arrays may be used. The array includes XOR gates 80 as described above, which have outputs that are connected to a memory 140 for storing combined output results comprising digital words as described above in relation to, for example, FIG. 13.

The secure electronic apparatus also includes an input signal generator 102 that is connected to the sensors 40 of the array 30 to provide the input signals described above to those sensors. The input signal generator 102 may, for example, be operable to generate one or more clock signals of the kind described above in relation to FIGS. 1 to 3, and may be configured to vary the input signal values applied to the sensors 40 of the array 30 by varying the delay between the clock signals. As already noted, it is envisaged that the sensors 40 need not necessarily be sensors of the kind described specifically in relation to FIG. 3, and accordingly, alternative forms for the input signals are envisaged.

The secure electronic apparatus further includes a finite state machine 100. The finite state machine can apply control signals to the input signal generator 102, the array 30 and the memory 140 to implement a measurement routine for detecting whether any of the sensors 40 in the array 30 have been tampered with.

In this example embodiment, following a start condition (for instance, a power-on reset), the state machine 100 can cause the input signal generator 102 to apply a plurality of input signal values to the inputs of the sensors 40 in the array 30. These input signal values may be provided in a sequence where each input signal value is applied to all of the sensors in the array 40, one input signal value at a time. After that first input signal value has been applied to the sensors 40 of the array 30 by the input signal generator 102, the digital outputs of the sensors 40 can be read out and XOR'ed by the XOR gates 80 to form a first combined output result of the measurement routine. The first combined output result of the measurement routine in this example would be a word 70 of the kind described above in relation to FIG. 13. The word 70 is stored in the memory 140. The input signal generator 102 may then increment the input signal value applied to the sensors 40 of the array 30 and again a combined output result comprising a word 70 of the kind described above in relation to FIG. 13 would be formed and saved in the memory 140. The above described routine can be repeated over a plurality of input signal values. The overall number of input signal values may be chosen in accordance with factors such as the desired resolution and anticipated spread of detection threshold values of the sensors 40, as well as the overall number of sensors in the array 30.

It is envisaged that the amount by which the input signal value is incremented does not have to be constant. In some example embodiments, the increment between the input signal values may vary such that the above mentioned bins are associated with unequal increments in the input signal value. The different increment sizes may be chosen in accordance with factors such as the anticipated number of changes in the digital signal outputs of the sensors 40. For instance, where it is anticipated that a relatively large number of changes in the outputs of the sensors 40 will result from a change in the input signal value, the increments may be made smaller. On the other hand, the increments may be made relatively large in parts of the measurement routine in which it is expected that relatively few sensors 40 of the array 30 will exceed their detection threshold value. Since the variations in detection threshold value generally may arise from random manufacturing variations, it is expected that the detection threshold values of the sensors may take a Gaussian distribution around a central value. In one example embodiment it is envisaged that the increment in the input signal value may be made relatively small for input signal values corresponding to the peak of the Gaussian and relatively large for input signal values corresponding to the tails of the Gaussian.

In some embodiments, the input signal values applied by the input signal generator 102 can sweep from a lower to a higher value, with the input signal values increasing monotonically throughout the measurement routine. On the other hand, the input signal values may sweep from a high value to a low value with the input signal values decreasing at each increment in a monatomic fashion.

In an alternative embodiment, it is envisaged that the order in which the input signal values are applied to the inputs of the sensors 40 of the array 30 may be modified randomly. The order may, for instance, be determined using a pseudo-random number generator, the same seed values being used at the beginning of the pre-tampering sequences and also for subsequent measurement routines. To make it harder for an attacker to break this random sequence strategy, the random sequences can be generated in an alternative way by random permutations of a given initial sequence. The perturbations may be different in the pre-tamper and later on measurements, provided the reverse permutations can be performed before comparison of the two. This can make it harder for an attacker to reverse-engineer the random sequence strategy by repeated observations. This alternative approach can potentially allow attacks, based on prior knowledge of the order in which the input signal values are applied to the sensors 40 of the array 30, to be defeated.

After all of the input signal values have been applied to the sensors 40 by the input signal generator 102 and the corresponding combined output results for each input signal value have been stored in the memory 140, the finite state machine 100 can signal a master module (e.g. a processor) provided for example on the integrated circuit that it may collect the combined output results from the memory 140. The master module need not be involved with the collection of the combined output results and also need not apply control signals to the input signal generator 102 or sensors 40 themselves, as this may be handled by the finite state machine 100. The master module on the integrated circuit can collect the combined output results stored in the memory 140 and compare the combined output results with a corresponding set of (e.g. pre-tampering) combined output results stored in a memory of the secure electronic apparatus. The memory in which the set of combined output results corresponding to the pre-tampering condition are stored may be the memory 140 shown in FIG. 16 or may be some other memory of the secure electronic apparatus. By comparing the combined output results gathered during the measurement routine with the set of combined output results stored in the memory, possible tampering of the secure electronic apparatus may be determined by detecting a difference between the results.

In one embodiment, if the finite state machine 100 does not signal the master module that it can collect the combined output results from the memory 140 as mentioned above within a predetermined time from the initiation of the measurement routine, the secure electronic device may conclude that tampering with the secure electronic apparatus has taken place.

Figure 17:
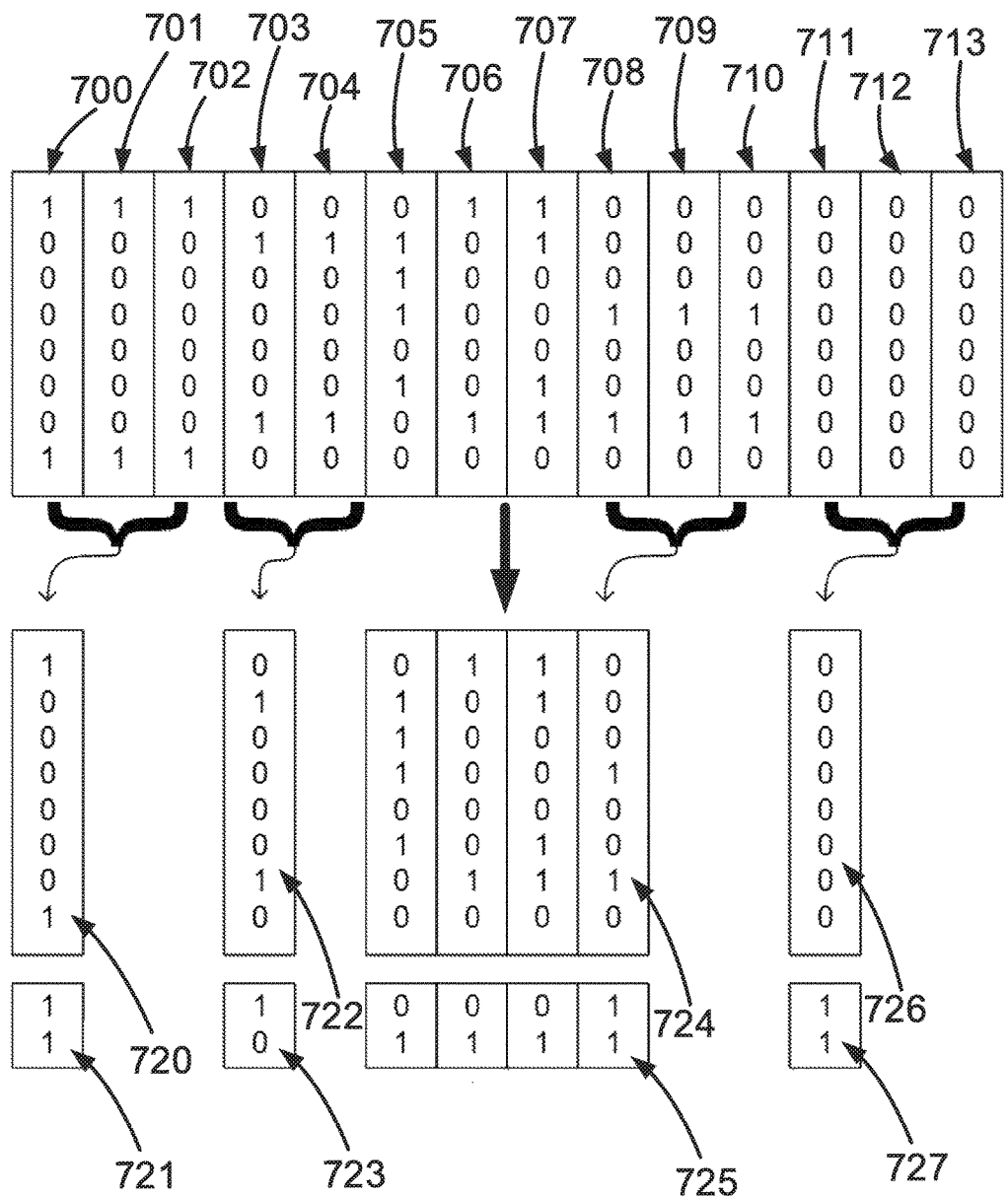
FIG. 17 shows another example of a set of combined output results for a plurality of input signal values in accordance with an embodiment of this invention.

FIG. 17 illustrates a further example of the manner in which the combined output results of the measurement routine can be stored and conveyed to a master module e.g. processor). At the top of FIG. 17, there is shown a set of combined output results 700-713, which in this example are digital words of the kind described above in relation to FIG. 13. In the present example, this set of digital words can be compressed using the following approach.

With reference to digital words 700, 701, 702, it is noted that these three digital words are identical ("10000001"). In accordance with the embodiment of FIG. 17, a compression of this information can be achieved by appending the digital word with one or more additional bits. This is represented by the digital word 720 in FIG. 17 and the additional bits 721. The digital word 720 represents the value of the digital words 700, 701, 702, while the value of the additional bit 721 ("11") indicates that the word 720 occurs three times.

Similarly, digital words 703, 704 are the equal in value and can be stored as digital word 722 ("01000010") with the further bits 723, which indicate with the value "10" that the word applies to two combined output results.

Digital words 705, 706, 707, each occur only once and accordingly are stored in full with the additional bits "01" indicating that those words indeed are not repeated. The above mentioned pattern can be continued on until all of the digital words for the measurement routine have been stored. Note that the digital words 720, 722, 724, 726 and their appended further bits 721, 723, 735, 727 require less storage spaced than the combined output results 701-713. Accordingly, the above mentioned methodology can be used to achieve a compression of the combined output results.

In some examples, data compressed in this way may be generated on the fly (i.e. during the measurement routine) for storage in memory and/or transfer to the master module. Alternatively the compression may be applied after all of the combined output results for a measurement routine have been collected. In the latter case, the compression may be applied on combined output results stored in memory, prior to sending the combined output results to a master module, whereby the amount of data to be transferred to the master module may be reduced.

As noted above, it is anticipated that in some embodiments, the statistical variation in the detection threshold values of the sensors will take a Gaussian distribution. It follows that it may be expected that input signal values corresponding to the tails of the Gaussian would lead to relatively few changes in the number of sensors reaching their detection threshold value and that a greater amount of repetition of the digital words associated with the combined output results at these input signal values may take place. In other words, it is anticipated that the compression achieved in this embodiment may be greatest at the tails of the Gaussian. This can be seen, for example, in FIG. 17, in which the combined output results 705, 706, 707 towards the sensor of the measurement routine occur only once, whereas a relatively large amount of repetition of the combined output results occurs towards the start and finish of the measurement routine.

Accordingly, there has been described a secure electronic apparatus and a method for determining that a secure electronic apparatus has been tampered with. The apparatus includes a memory and a plurality of sensors which each to receive an input signal and output a digital signal determined by the input signal and by a physical quantity sensed by the sensor (e.g. capacitance). A measurement routine includes applying a plurality of input signal values to the sensors and, for each input signal value, using the digital output signals of each sensor to determine a combined output result. The combined output results of the measurement routine are compared with a set of combined output results stored in the memory. A detected a difference between the combined output results of the measurement routine and the set of combined output results stored in the memory can be used to determine that the secure electronic apparatus has been tampered with.

Although particular embodiments of the invention have been described, it will be appreciated that many modifications/additions and/or substitutions may be made within the scope of the claimed invention.

What is claimed is:

1. A method for performing a measurement routine by a secure electronic apparatus, wherein the secure electronic apparatus includes a memory and a plurality of sensors, wherein each sensor includes an input operable to receive an input signal and an output operable to output a digital signal determined by a value of the input signal and by a physical quantity sensed by the sensor, wherein the digital signal is indicative of whether the value of the input signal exceeds a detection threshold value for that sensor, the method comprising:

applying a plurality of input signal values to the inputs of the sensors;

for each input signal value, using the digital signals outputted by the sensors to determine a combined output result;

comparing the combined output results of the measurement routine with a set of combined output results stored in the memory, and in response to detecting a difference between the combined output results of the measurement routine and the set of combined output results stored in the memory, determining that the secure electronic apparatus has been tampered with;

wherein the combined output result for each input signal value comprises a digital word comprising a plurality of bits, wherein the sensors are organised in a plurality of groups, each bit of the digital word corresponding to a respective one of said groups, and wherein a value of each bit of the digital word is determined by XOR'ing the digital signals outputted by the sensors in the group corresponding to that bit.

2. The method of claim 1, wherein each digital word is appended with one or more bits indicative of the number of groups of sensors to which that digital word is applicable.

3. The method of claim 1, wherein the secure electronic apparatus includes a chain of XOR gates, wherein a first input of each XOR gate is connected to the output of one of the sensors, and wherein a second input of at least some of the XOR gates is connected to an output of a preceding XOR gate in the chain.

4. The method of claim 1, wherein at least some of the sensors belong to more than one group.

5. The method of claim 1, wherein the input signal values applied to the inputs of the sensors change monotonically during the measurement routine.

6. The method of claim 1, wherein an order in which input signal values are applied to the inputs of the sensors is determined pseudo randomly.

7. The method of claim 1, wherein an increment between neighbouring pairs of input signal values varies between different pairs of input signal values of the measurement routine.

8. A method for performing a measurement routine by a secure electronic apparatus, wherein the secure electronic apparatus includes a memory and a plurality of sensors, wherein each sensor includes an input operable to receive an input signal and an output operable to output a digital signal determined by a value of the input signal and by a physical quantity sensed by the sensor, wherein the digital signal is indicative of whether the value of the input signal exceeds a detection threshold value for that sensor, the method comprising:

applying a plurality of input signal values to the inputs of the sensors;

for each input signal value, using the digital signals outputted by the sensors to determine a combined output result;

comparing the combined output results of the measurement routine with a set of combined output results stored in the memory, and in response to detecting a difference between the combined output results of the measurement routine and the set of combined output results stored in the memory, determining that the secure electronic apparatus has been tampered with;

wherein the combined output result for an nth input signal value of the measurement routine comprises a value indicating the number of sensors for which the detection threshold value has been exceeded compared to the number of sensors for which the detection threshold value was exceeded for an (n−1)th input signal value.

9. The method of claim 8, wherein the combined output results of the measurement routine form a histogram having a plurality of bins, wherein a value in each bin corresponds to a respective combined output result of the measurement routine.

10. A method for performing a measurement routine by a secure electronic apparatus, wherein the secure electronic apparatus includes a memory and a plurality of sensors, wherein each sensor includes an input operable to receive an input signal and an output operable to output a digital signal determined by a value of the input signal and by a physical quantity sensed by the sensor, wherein the digital signal is indicative of whether the value of the input signal exceeds a detection threshold value for that sensor, the method comprising:

applying a plurality of input signal values to the inputs of the sensors;

for each input signal value, using the digital signals outputted by the sensors to determine a combined output result;

comparing the combined output results of the measurement routine with a set of combined output results stored in the memory, and in response to detecting a difference between the combined output results of the measurement routine and the set of combined output results stored in the memory, determining that the secure electronic apparatus has been tampered with;

wherein the physical quantity sensed by each sensor comprises the capacitances of two sense capacitors of each sensor, and wherein the digital signal is determined by a ratio of the capacitances of the two capacitors and by the value of the input signal.

11. The method of claim 10, wherein the combined output result for each input signal value comprises a digital word comprising a plurality of bits, wherein the sensors are organised in a plurality of groups, each bit of the digital word corresponding to a respective one of said groups, and wherein a value of each bit of the digital word is determined by XOR'ing the digital signals outputted by the sensors in the group corresponding to that bit.

12. The method of claim 10, wherein the input signal comprises a pair of clock signals and wherein the input signal value comprises a delay between the pair of clock signals.

13. The method of claim 10, further comprising collecting all of the combined output results prior to comparison of the combined output results with the set of combined outputs results stored in the memory.

14. A method for performing a measurement routine by a secure electronic apparatus, the method comprising:

applying a plurality of input signal values to inputs of a plurality of sensors;

for each input signal value, using digital signals outputted by the plurality of sensors to determine a combined output result;

comparing the combined output results of the measurement routine with a set of combined output results, and in response to detecting a difference between the combined output results of the measurement routine and the set of combined output results, determining that the secure electronic apparatus has been tampered with;

wherein the combined output result for each input signal value comprises a digital word comprising a plurality of bits, wherein the plurality of sensors are organised in a plurality of groups, each bit of the digital word corresponding to a respective one of said groups, and wherein a value of each bit of the digital word is determined by XOR'ing the digital signals outputted by the plurality of sensors in the group corresponding to that bit.

15. The method of claim 14, wherein each digital word is appended with one or more bits indicative of the number of groups of sensors to which that digital word is applicable.

16. A method for performing a measurement routine by a secure electronic apparatus, the method comprising:

applying a plurality of input signal values to inputs of a plurality of sensors;

for each input signal value, using digital signals outputted by the plurality of sensors to determine a combined output result;

comparing the combined output results of the measurement routine with a set of combined output results, and in response to detecting a difference between the combined output results of the measurement routine and the set of combined output results, determining that the secure electronic apparatus has been tampered with;

wherein the combined output result for an nth input signal value of the measurement routine comprises a value indicating the number of sensors for which the detection threshold value has been exceeded compared to the number of sensors for which the detection threshold value was exceeded for an (n−1)th input signal value.

17. The method of claim 16, wherein the combined output result for each input signal value comprises a digital word comprising a plurality of bits, wherein the plurality of sensors are organised in a plurality of groups, each bit of the digital word corresponding to a respective one of said groups, and wherein a value of each bit of the digital word is determined by XOR'ing the digital signals outputted by the plurality of sensors in the group corresponding to that bit.

18. The method of claim 16, wherein the combined output results of the measurement routine form a histogram having a plurality of bins, wherein a value in each bin corresponds to a respective combined output result of the measurement routine.

19. A method for performing a measurement routine by a secure electronic apparatus, the method comprising:

applying a plurality of input signal values to inputs of a plurality of sensors;

for each input signal value, using digital signals outputted by the plurality of sensors to determine a combined output result;

comparing the combined output results of the measurement routine with a set of combined output results, and in response to detecting a difference between the combined output results of the measurement routine and the set of combined output results, determining that the secure electronic apparatus has been tampered with;

wherein the physical quantity sensed by each sensor comprises the capacitances of two sense capacitors of each sensor, and wherein the digital signal is determined by a ratio of the capacitances of the two capacitors and by the value of the input signal.

20. The method of claim 19, wherein the input signal comprises a pair of clock signals and wherein the input signal value comprises a delay between the pair of clock signals.

\* \* \* \* \*